(12) United States Patent
Kaechi

(10) Patent No.: US 10,199,874 B2
(45) Date of Patent: Feb. 5, 2019

(54) POWER SUPPLY APPARATUS FOR WIRELESSLY SUPPLYING POWER TO EXTERNAL APPARATUS, CONTROL METHOD FOR POWER SUPPLY APPARATUS, AND RECORDING MEDIUM

(71) Applicant: CANON KABUSHIKI KAISHA, Tokyo (JP)

(72) Inventor: Shuya Kaechi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 15/296,819

(22) Filed: Oct. 18, 2016

(65) Prior Publication Data
US 2017/0117752 A1  Apr. 27, 2017

(30) Foreign Application Priority Data

Oct. 23, 2015 (JP) ................. 2015-208835

(51) Int. Cl.
| | |
|---|---|
| *H02J 50/12* | (2016.01) |
| *H02J 50/80* | (2016.01) |
| *H02J 50/90* | (2016.01) |
| *H02J 7/02* | (2016.01) |
| *H02J 50/20* | (2016.01) |
| *H02J 50/60* | (2016.01) |

(52) U.S. Cl.
CPC .............. *H02J 50/12* (2016.02); *H02J 7/025* (2013.01); *H02J 50/20* (2016.02); *H02J 50/60* (2016.02); *H02J 50/80* (2016.02); *H02J 50/90* (2016.02)

(58) Field of Classification Search
CPC ..................................................... H02J 50/12
USPC .......................................................... 307/104
See application file for complete search history.

(56) References Cited

U.S. PATENT DOCUMENTS

2014/0285027 A1* 9/2014 Sakamoto ............ B60L 11/182
                                                                 307/104

FOREIGN PATENT DOCUMENTS

| JP | H11224822 A | 8/1999 |
|---|---|---|
| JP | 2006042519 A | 2/2006 |

* cited by examiner

*Primary Examiner* — Joseph Chang
(74) *Attorney, Agent, or Firm* — Canon U.S.A., Inc. IP Division

(57) ABSTRACT

In various embodiments, a power supply apparatus for wirelessly transmitting electric power includes a power supply unit configured to output a wireless signal of a predetermined frequency to supply power to a power receiving apparatus, a communication unit, and a control unit, wherein the control unit receives data from the power receiving apparatus via the communication unit, and controls an output of the power supply unit based on the data, and wherein the control unit detects intensity of a harmonic component of the wireless signal output from the power supply apparatus, and controls the output of the power supply unit such that the detected intensity of the harmonic component becomes equal to or less than a predetermined value.

15 Claims, 18 Drawing Sheets

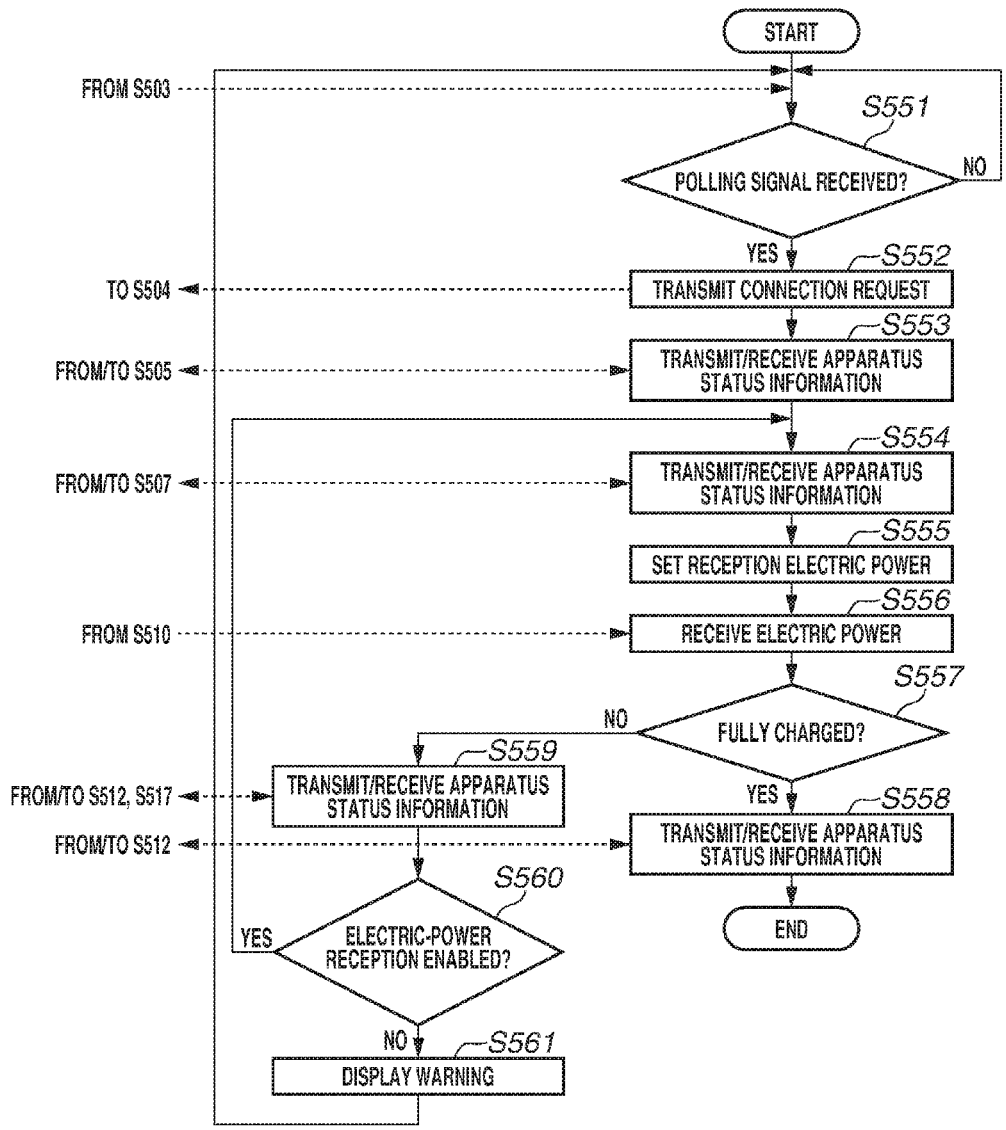

FIG.6A

| APPARATUS NAME | POWER RECEIVING APPARATUS 200 | TRANSMISSION ↔ RECEPTION |
|---|---|---|
| POWER-RECEPTION ENABLED/DISABLED | ENABLED | TRANSMISSION ← RECEPTION |
| BATTERY VOLTAGE | 3.4 V | TRANSMISSION ← RECEPTION |
| BATTERY FULL CHARGE VOLTAGE | 4.2 V | TRANSMISSION ← RECEPTION |
| REMAINING BATTERY LEVEL | 40% | TRANSMISSION ← RECEPTION |
| MAXIMUM POWER RECEPTION | 3.0 W | TRANSMISSION ← RECEPTION |
| TRANSMISSION/RECEPTION REQUESTED ELECTRIC POWER | 2.8 W | TRANSMISSION ← RECEPTION |
| TRANSMISSION/RECEPTION SET ELECTRIC POWER | 2.8 W | TRANSMISSION ↔ RECEPTION |
| ELECTRIC POWER TO BE RECEIVED | 2.24 W | TRANSMISSION ← RECEPTION |
| POWER-TRANSMISSION ENABLED/DISABLED | ENABLED | TRANSMISSION → RECEPTION |

FIG.6B

| APPARATUS NAME | POWER RECEIVING APPARATUS 200 | TRANSMISSION ↔ RECEPTION |
|---|---|---|
| POWER-RECEPTION ENABLED/DISABLED | ENABLED | TRANSMISSION ← RECEPTION |
| BATTERY VOLTAGE | 3.4 V | TRANSMISSION ← RECEPTION |
| BATTERY FULL CHARGE VOLTAGE | 4.2 V | TRANSMISSION ← RECEPTION |
| REMAINING BATTERY LEVEL | 40% | TRANSMISSION ← RECEPTION |
| MAXIMUM POWER RECEPTION | 3.0 W | TRANSMISSION ← RECEPTION |
| TRANSMISSION/RECEPTION REQUESTED ELECTRIC POWER | 2.8 W | TRANSMISSION ← RECEPTION |
| TRANSMISSION/RECEPTION SET ELECTRIC POWER | 2.8 W | TRANSMISSION ↔ RECEPTION |
| ELECTRIC POWER TO BE RECEIVED | 2.24 W | TRANSMISSION ← RECEPTION |
| POWER-TRANSMISSION ENABLED/DISABLED | DISABLED | TRANSMISSION → RECEPTION |

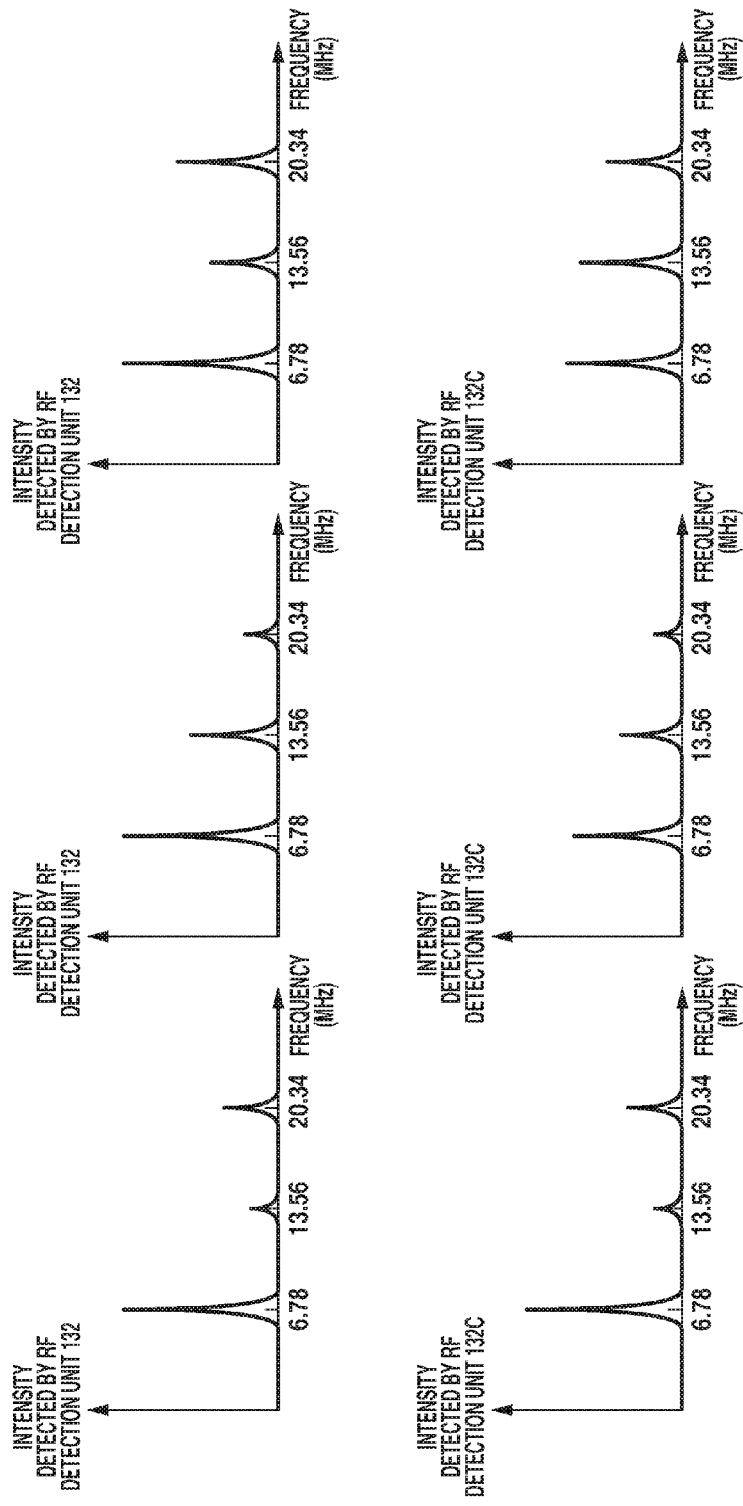

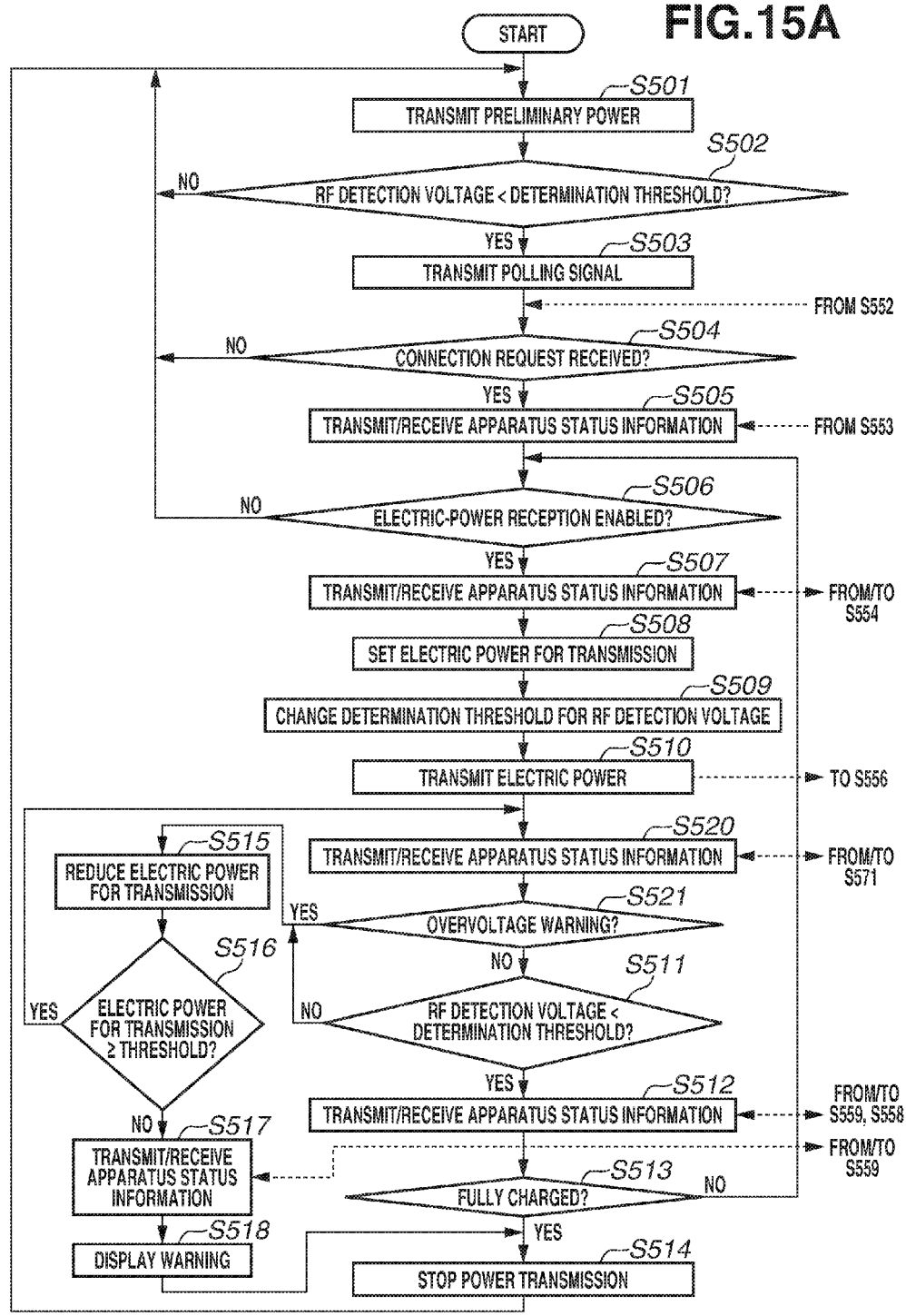

FIG.16A

| APPARATUS NAME | POWER RECEIVING APPARATUS 200 | TRANSMISSION ↔ RECEPTION |
|---|---|---|
| POWER-RECEPTION ENABLED/DISABLED | ENABLED | TRANSMISSION ← RECEPTION |
| BATTERY VOLTAGE | 3.4 V | TRANSMISSION ← RECEPTION |
| BATTERY FULL CHARGE VOLTAGE | 4.2 V | TRANSMISSION ← RECEPTION |
| REMAINING BATTERY LEVEL | 40% | TRANSMISSION ← RECEPTION |
| MAXIMUM POWER RECEPTION | 3.0 W | TRANSMISSION ← RECEPTION |
| TRANSMISSION/RECEPTION REQUESTED ELECTRIC POWER | 2.8 W | TRANSMISSION ← RECEPTION |
| TRANSMISSION/RECEPTION SET ELECTRIC POWER | 2.8 W | TRANSMISSION ↔ RECEPTION |
| ELECTRIC POWER TO BE RECEIVED | 2.24 W | TRANSMISSION ← RECEPTION |
| POWER-TRANSMISSION ENABLED/DISABLED | ENABLED | TRANSMISSION → RECEPTION |
| ANTENNA OVERVOLTAGE WARNING | ABSENT | TRANSMISSION ← RECEPTION |

FIG.16B

| APPARATUS NAME | POWER RECEIVING APPARATUS 200 | TRANSMISSION ↔ RECEPTION |
|---|---|---|
| POWER-RECEPTION ENABLED/DISABLED | ENABLED | TRANSMISSION ← RECEPTION |
| BATTERY VOLTAGE | 3.4 V | TRANSMISSION ← RECEPTION |
| BATTERY FULL CHARGE VOLTAGE | 4.2 V | TRANSMISSION ← RECEPTION |
| REMAINING BATTERY LEVEL | 40% | TRANSMISSION ← RECEPTION |
| MAXIMUM POWER RECEPTION | 3.0 W | TRANSMISSION ← RECEPTION |
| TRANSMISSION/RECEPTION REQUESTED ELECTRIC POWER | 2.8 W | TRANSMISSION ← RECEPTION |
| TRANSMISSION/RECEPTION SET ELECTRIC POWER | 2.8 W | TRANSMISSION ↔ RECEPTION |
| ELECTRIC POWER TO BE RECEIVED | 2.24 W | TRANSMISSION ← RECEPTION |
| POWER-TRANSMISSION ENABLED/DISABLED | ENABLED | TRANSMISSION → RECEPTION |
| ANTENNA OVERVOLTAGE WARNING | PRESENT | TRANSMISSION ← RECEPTION |

POWER SUPPLY APPARATUS FOR WIRELESSLY SUPPLYING POWER TO EXTERNAL APPARATUS, CONTROL METHOD FOR POWER SUPPLY APPARATUS, AND RECORDING MEDIUM

BACKGROUND OF THE INVENTION

Field of the Invention

Aspects of the present invention relate to a power supply apparatus for wirelessly supplying power to an external apparatus.

Description of the Related Art

In wireless power transmission, an antenna (a power receiving antenna) of a power receiving apparatus on a power receiving side receives an electromagnetic wave emitted from an antenna (a power transmission antenna) of a power transmission apparatus on a power transmission side. Electric power is thereby transmitted from the power transmission apparatus to the power receiving apparatus. It is not desirable that the power transmission apparatus emit the electromagnetic wave conveying the electric power in an uncontrolled state. Therefore, in general, the power transmission apparatus and the power receiving apparatus acquire power transmission/reception information from each other by communication prior to the wireless power transmission, and then the power transmission apparatus emits, from the antenna, an electric power wave of power determined according to the power transmission/reception information.

When carrying out such wireless power transmission, it is necessary to give consideration to preventing the electric power wave emitted from the power transmission antenna, from exerting influence such as heat on a contactless IC card or the like which is unintentionally brought nearby. Assume that the frequency of the electric power wave emitted from the power transmission antenna is, for example, about 13.56 MHz in the high frequency (HF) band. In this case, a contactless IC card equipped with an antenna having a resonance frequency of about 13.56 MHz can receive notable influence such as heat exerted by this electric power wave. Further, assume that the frequency of the electric power wave emitted from the power transmission antenna is, for example, about 6.78 MHz in the HF band. Even in this case, it is not possible to avoid adverse influence such as heat generation on the contactless IC card equipped with the antenna having the resonance frequency of about 13.56 MHz that is twice as high as 6.78 MHz.

Japanese Patent Application Laid-Open. No. 2006-42519 discusses a wireless power transmission system including a transmission apparatus having a first plane coil, and a power receiving apparatus having a second plane coil. In this system, a magnetic sheet is provided on each of surfaces opposite to the respective surfaces facing each other of the first plane coil and the second plane coil.

Japanese Patent Application Laid-Open No. 11-224822 discusses a contactless power supply apparatus for wirelessly transmitting electric power from a primary side to a secondary side, by magnetizing a power supply line on primary side. In this apparatus, a harmonic current flowing through the power supply line on the primary side is reduced by changing an output voltage waveform of a high frequency inverter in two or more stages. In the configuration discussed in Japanese Patent Application Laid-Open. No. 2006-42519, unnecessary radiation from the coil is suppressed by the magnetic sheet, but influence caused by a change in an operation state or usage state is not considered. In a case of tight coupling such as electromagnetic induction, the configuration discussed in Japanese Patent Application. Laid-Open. No. 2006-42519 is effective. However, in a case of loose coupling such as magnetic resonance for transmitting the electric power, it is difficult to suppress radiation of a magnetic field.

The harmonic component included in the electric power wave is also influenced by a change in operation state or usage state of an apparatus that is present outside the power transmission apparatus. However, such influence is not taken into consideration in the harmonic current suppression discussed in Japanese Patent Application Laid-Open No. 11-224822, and an intended effect thereof is not obtained in some cases.

Therefore, the configuration discussed in each of Japanese Patent Application Laid-Open Nos. 2006-42519 and 11-224822 cannot reduce the possibility that the electric power wave emitted from the power transmission antenna may exert adverse influence such as heat generation on the nearby contactless IC card.

SUMMARY OF THE INVENTION

According to various embodiments of the present invention, a power supply apparatus for wirelessly transmitting electric power includes a power supply unit configured to output a wireless signal of a predetermined frequency to supply power to a power receiving apparatus, a communication unit, and a control unit, wherein the control unit receives data from the power receiving apparatus via the communication unit, and controls an output of the power supply unit based on the data, and wherein the control unit detects intensity of a harmonic component of the wireless signal output from the power supply apparatus, and controls the output of the power supply unit such that the detected intensity of the harmonic component becomes equal to or less than a predetermined value.

Further features of the present invention will become apparent from the following description of exemplary embodiments with reference to one attached drawings.

BRIEF DESCRIPTION OF THE DRAWINGS

FIGS. 5A and 5B illustrate a flowchart of operation of the power transmission apparatus, and a flowchart of operation of the power receiving apparatus, respectively.

FIGS. 6A and 6B illustrate an example of apparatus status information to be transmitted and received between the power transmission apparatus and the power receiving apparatus.

FIGS. 14A, 14B, and 14C illustrate a spectrum example detected by each RF detection unit, corresponding to the layout, examples illustrated in FIGS. 13A, 13B, and 13C, respectively.

FIGS. 15A and 15B illustrate a flowchart of operation of the power transmission apparatus illustrated in FIG. 12, and a flowchart of operation of the power receiving apparatus corresponding to the power transmission apparatus illustrated in FIG. 12, respectively.

FIGS. 16A and 16B illustrate an example of apparatus status information to be transmitted and received between the power transmission apparatus in FIG. 12 and the power receiving apparatus corresponding thereto.

DESCRIPTION OF THE EMBODIMENTS

Exemplary embodiments of the present invention will be described in detail below with reference to the drawings. However, the present invention is not limited to the exemplary embodiments described below.

Figure 1:
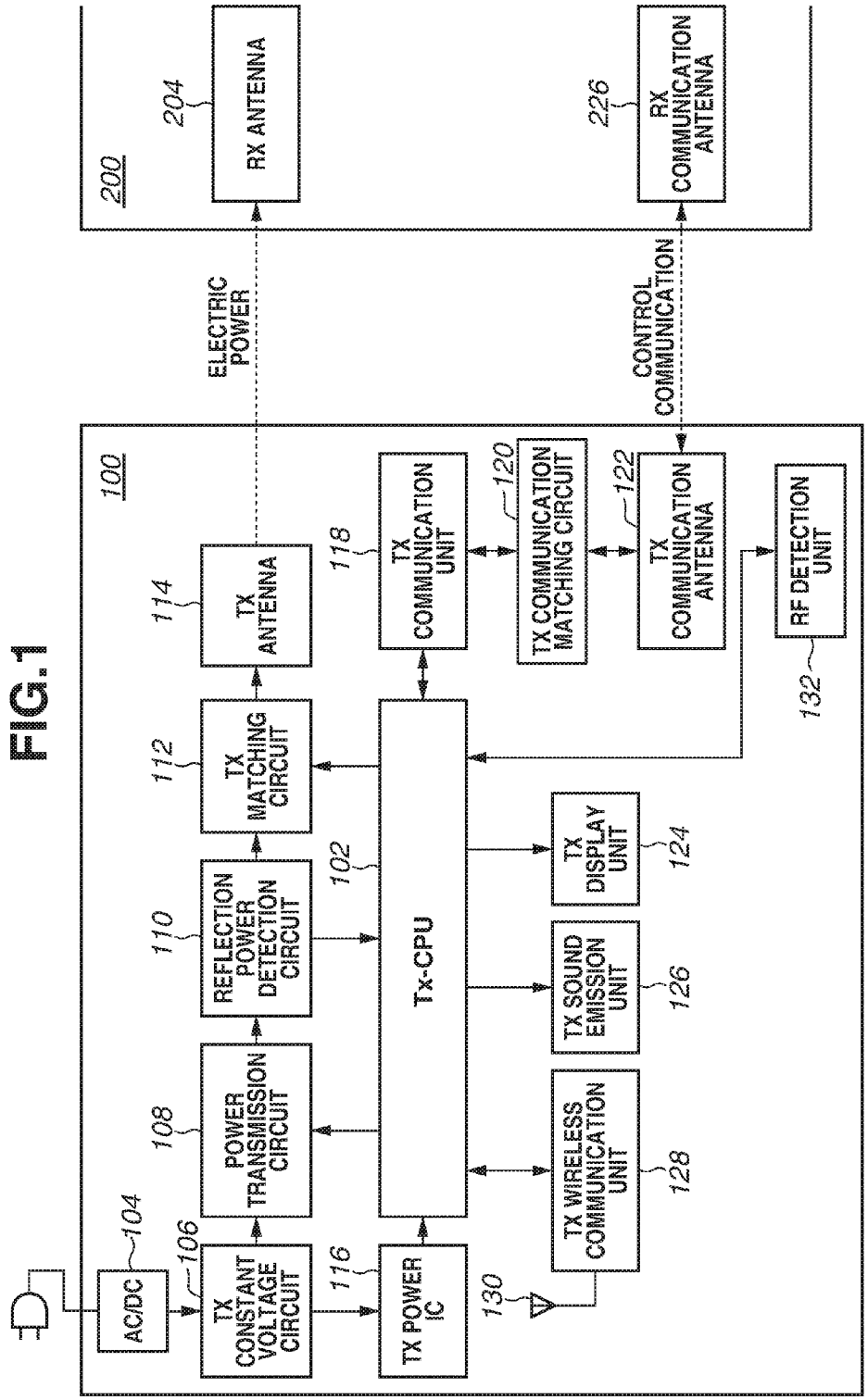
FIG. 1 is a schematic configuration block diagram of a power transmission apparatus according to a first exemplary embodiment of the present invention in a wireless power transmission system according to an exemplary embodiment of the present invention.
Figure 2:
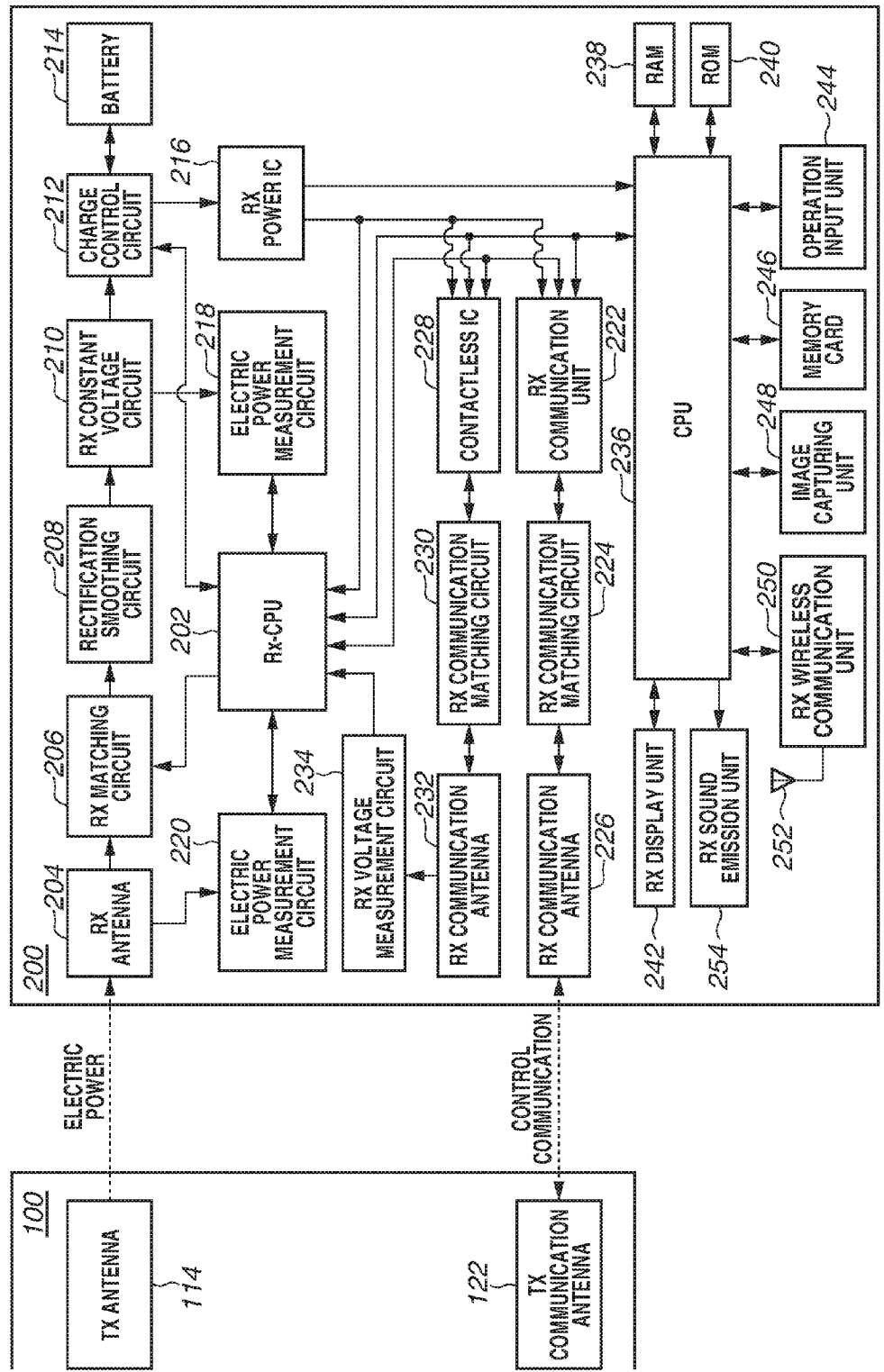
FIG. 2 is a schematic configuration block diagram of a power receiving apparatus illustrated in FIG. 1.

A first exemplary embodiment will be described below. A wireless power transmission system according to an exemplary embodiment of the present invention includes a power transmission apparatus and power receiving apparatus, and transmits electric power from the power transmission apparatus to the power receiving apparatus wirelessly or without making contact. FIG. 1 illustrates a schematic, configuration block diagram of a power transmission apparatus 100 according to the first exemplary embodiment of the present invention in the wireless power transmission system according to the exemplary embodiment of the present invention. FIG. 2 illustrates a schematic configuration block diagram of a power receiving apparatus 200. According to the first exemplary embodiment, electric power, which is received by the power receiving apparatus 200 and corresponds to electric power transmitted by the power transmission apparatus 100, may be referred to as transmission/reception electric power or supply power. In addition, the ratio of the electric power received by the power receiving apparatus 200 to the electric power transmitted by the power transmission apparatus 100 may be referred to as power-supply efficiency.

A configuration and basic operation of the power transmission apparatus 100 illustrated in FIG. 1 will be described. A power-transmission-side control circuit (a transmitter central processing unit (TX-CPU) 102 is a CPU for controlling the power transmission apparatus 100. The TX-CPU 102 incorporates a random access memory (RAM) to be used as a work area, and a read only memory (ROM) for storing a processing procedure of the TX-CPU 102.

An alternating-current/direct-current (AC/DC conversing circuit 104 converts an AC voltage input from an outside of the power transmission apparatus 100 into a DC voltage. A TX constant voltage circuit 106 converts the DC voltage output from the AC/DC converting circuit 104 into a voltage, which can be supplied to a circuit block in a subsequent stage.

A power transmission circuit 108 generates out of the output of the TX constant voltage circuit 106 an electric power signal used for conveying electric power which is wirelessly transmitted to the power receiving apparatus 200. The power transmission circuit 108 is configured of a transistor amplifier circuit and a crystal oscillator circuit. The electric power signal to be output from the power transmission circuit 108 is applied to a power transmission antenna (a TX antenna) 114 via a reflection power detection circuit 110 and a TX matching circuit 112.

The reflection power detection circuit 110 detects a traveling wave and a reflected wave of an electric power wave, which is emitted from the power transmission antenna 114 to the outside, as a traveling wave voltage VF and a reflected wave voltage VR, respectively. The reflection power detection circuit 110 is configured of, for example, a capacitance mutual inductance (CM) directional coupler. The CM directional coupler is an ordinary circuit and thus will not be described.

The TX matching circuit 112 is a circuit for performing impedance matching between the power transmission circuit 108 and the power transmission antenna 114. The degree of the impedance matching of the TX matching circuit 112 can be adjusted from outside, for example, by the TX-CPU 102. The TX matching circuit 112 includes a protection circuit for preventing output of an excessive voltage at the time of power transmission to the power receiving apparatus 200.

The Power transmission antenna 114 is an antenna for emitting an electric power signal from the TX matching circuit 112 as the electric power wave, to the power receiving apparatus 200. The power transmission antenna 114 has, for example, a resonance frequency of about 6.78 MHz which is in the HF band.

A TX power integrated circuit (IC) 116 converts the output voltage of the TX constant voltage circuit 106 into a voltage that can be supplied to a digital low-voltage circuit block in a subsequent stage.

A TX communication unit 118 is provided to perform short-range wireless communication with other nearby apparatus (here, the power receiving apparatus 200). Here, the TX communication unit 118 is used for communication of control data to transmit power to the power receiving apparatus 200. The TX communication unit 118 is compliant with, for example, Bluetooth® low energy (also sometimes referred to as Bluetooth® LE or BLE), which is a short-range wireless communication standard.

A TX communication matching circuit 120 is a circuit for performing impedance matching between the TX communication unit 118 and a TX communication antenna 122. The TX communication matching circuit 120 may be a circuit in which the impedance matching is adjusted under the control of the TX-CPU 102, or may be a fixed constant circuit. The TX communication matching circuit 120 includes a protection circuit for preventing output of the excessive voltage.

The TX communication antenna 122 is used for performing short-range wireless communication with other apparatus (here, the power receiving apparatus 200). The TX communication antenna 122 has, for example, a resonance frequency of about 2.4 GHz in the UHF band.

A TX display unit 124 is a unit for displaying a status of the power transmission apparatus 100. The TX display unit 124 is configured of, for example, a liquid crystal display (LCD) and/or a light emitting diode (LED).

A TX sound emission unit 126 is a unit for emitting operation sound and warning sound of the power transmission apparatus 100, and is configured of, for example, an audio processing IC and a speaker.

The power transmission apparatus 100 further includes a TX wireless communication unit 128 and an antenna 130. The TX wireless communication unit 128 can wirelessly communicate with other apparatus via the antenna 130. The TX wireless communication unit 128 is compliant with a wireless standard different from the standard of the TX communication unit 118, and is compliant with, for example, the Institute of Electrical and Electronic Engineers (IEEE) 802.11, which is a wireless local area network (WLAN) standard.

A radio frequency (RF) detection unit 132 detects the intensity level of an electromagnetic wave emitted from the power transmission antenna 114. A detailed configuration of the RF detection unit 132 will be described below with reference to FIG. 3. The TX-CPU 102 controls electric power to be transmitted according to a voltage value indicating the intensity level detected by the RF detection unit 132. The TX-CPU 102 can change a voltage detection level and a voltage detection gain of the RF detection unit 132.

Figure 3:
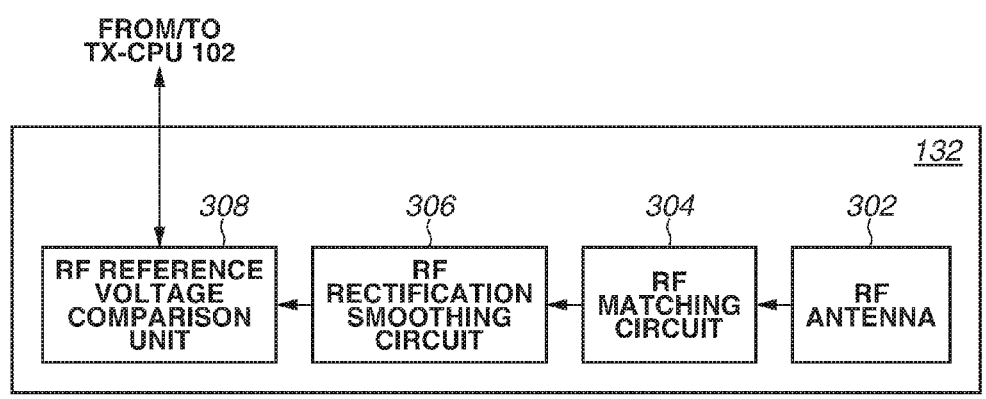
FIG. 3 is a schematic configuration block diagram of a radio frequency (RF) detection unit of the power transmission apparatus.

A configuration and basic operation of the RF detection unit 132 will be described with reference to FIG. 3. An RF antenna 302 has, for example, a resonance frequency of about 13.56 MHz in the HF band. An RF matching circuit 304 is a circuit for performing impedance matching between the RF antenna 302 and an RF rectification smoothing circuit 306. The RF rectification smoothing circuit 306 rectifies an AC voltage generated in the RF antenna 302 to a DC voltage. An RF reference voltage comparison unit 308 compares a DC voltage value output from the RF rectification smoothing circuit 306 after the rectification with a reference voltage, and then inputs a comparison result thereof (or a difference voltage value) to the TX-CPU 102. The reference voltage of the RF reference voltage comparison unit 308 may be a fixed value, or may be changeable by the TX-CPU 102.

The DC voltage value output from the RF rectification smoothing circuit 306 after the rectification may be directly input to the TX-CPU 102. The input to the TX-CPU 102 may be either an analog signal or a digital signal, and which of these signals is used may be determined by composing elements and a control system of the power transmission apparatus 100.

A configuration and basic operation of the power receiving apparatus 200 will be described with reference to FIG. 2. A power-receiving-side control unit (a receiver CPU (RX-CPU)) 202 is a unit for controlling power transmission of the power transmission apparatus 100 to the power receiving apparatus 200 through communicating with the power transmission apparatus 100. The RX-CPU 202 thereby controls operation of the power receiving apparatus 200. The RX-CPU 202 incorporates a RAM used as a work area, and a ROM for storing a processing procedure of the RX-CPU 202.

A power receiving antenna (RX antenna) 204 is an antenna for receiving a power wave from the power transmission antenna 114 of the power transmission apparatus 100. The RX antenna 204 corresponds to the power transmission antenna 114, and has, for example, a resonance frequency of about 6.78 MHz in the HF band.

An RX matching circuit 206 is a circuit for performing impedance matching between the power receiving antenna 204 and a rectification smoothing circuit 208. The degree of the impedance matching of the RX matching circuit 206 can be adjusted from outside, for example, by the RX-CPU 202. The RX matching circuit 206 includes a protection circuit for preventing generation of an excessive voltage in the circuit at the time of receiving electric power from the power transmission apparatus 100.

The rectification smoothing circuit 208 rectifies an AC voltage generated out of electric power received from the power transmission apparatus 100, to a DC voltage. An RX constant voltage circuit 210 converts the DC voltage output from the rectification smoothing circuit 208 into various voltages to be supplied to circuit blocks in subsequent stages.

A charge control circuit 212 charges a battery 214 through a predetermined controlling process, and supplies an output voltage of the battery 214 to other circuits. Here, the battery 214 is made of one cell of lithium ion battery.

An RX power IC 216 is provided to convert an input voltage into a voltage for a digital low-voltage circuit block in a subsequent stage.

An electric power measurement circuit 218 measures output power of the RX constant voltage circuit 210, and an electric power measurement circuit 220 measures output power of the power receiving antenna 204. A configuration of each of the electric power measurement circuits 218 and 220 is an ordinary one and thus will not be described in detail. In a case where it is not necessary to measure the output power of both blocks simultaneously, a single electric power measurement circuit may be provided to switch between the measurement of the output power of the RX constant voltage circuit 210 and the measurement of the output power of the power receiving antenna 204, as necessary.

An RX communication unit 222 is a unit for performing short-range wireless communication with a nearby apparatus the power transmission apparatus 100). Here, the RX communication unit 222 used for communication of control data to carry out wireless power transmission to the power transmission apparatus 100. For example, the RX communication unit 222 is compliant with Bluetooth® low energy, which is a short-range wireless communication standard. An RX communication matching circuit 224 is a circuit for performing impedance matching between the RX communication unit 222 and an RX communication antenna 226. The RX communication matching circuit 224 may be a circuit in which the impedance matching can be adjusted under the control of the RX-CPU 202, or may be a fixed constant circuit. The RX communication matching circuit 224 is configured to include a protection circuit for preventing generation of an excessive voltage.

Information can be read from and written to a contactless IC 228 by a contactless IC reader/writer function of another apparatus. The contactless IC 228 is compliant with, for example, the International Organization for Standardization and International Electrotechnical Committee (ISO/IEC) 21481, which an international standard for short-range wireless communication.

An RX communication matching circuit 230 is a circuit for performing impedance matching between the contactless IC 228 and an RX communication antenna 232. The RX communication matching circuit 230 may be a circuit that can be adjusted under the control of the RX-CPU 202, or may be a fixed constant circuit. Further, the RX communication matching circuit 230 includes a protection circuit for preventing generation of an excessive voltage. The RX communication antenna 232 is do antenna having, for example, a resonance frequency of about 13.56 MHz in the HF band.

An RX voltage measurement circuit 234 measures a voltage generated in the RX communication antenna 232, and notifies a CPU 236 of a voltage value obtained by the measurement. The CPU 236 uses this voltage value to monitor the operation state of the contactless IC 228. The RX voltage measurement circuit 234 has an ordinary configuration, and therefore a detailed internal configuration thereof will not be described.

The CPU 236 controls the entire power receiving apparatus 200. For easy understanding, the CPU 236 is illustrated separately from the RX-CPU 202 that is in charge of controlling the received electric power. However, a single device may execute the functions of both CPUs. A RAM 238 is used as a work area of the CPU 236. A ROM 240 is provided to store a processing procedure of the CPU 236, and configured of, for example, a rewritable nonvolatile memory such as a flash memory.

An RX display unit 242 is configured of an LCD for displaying image data, operation information of the power receiving apparatus 200, and the like. An operation input unit 244 receives various kinds of operation of a user performed on the power receiving apparatus 200, and transmits the operation information to the CPU 236.

A memory card 246 is a storage medium to/from which digital data can be written/read. An image capturing unit 248 is configured of an optical unit and an image sensor. The optical unit includes a lens and a driving system therefore.

The power receiving apparatus 200 further includes an RX wireless communication unit 250 and an antenna 252. The RX wireless communication unit 250 can wirelessly communicate with other apparatus via the antenna 252. The RX wireless communication unit 250 is compliant with a wireless standard different from the standard of the RX communication unit 222, and is compliant with, for example, IEEE 802.11, which is a WLAN standard.

An RX sound emission unit 254 is a unit for emitting sound such as operation sound and warning sound for the power receiving apparatus 200, and is configured of, for example, an audio processing IC and a speaker.

Figure 4:
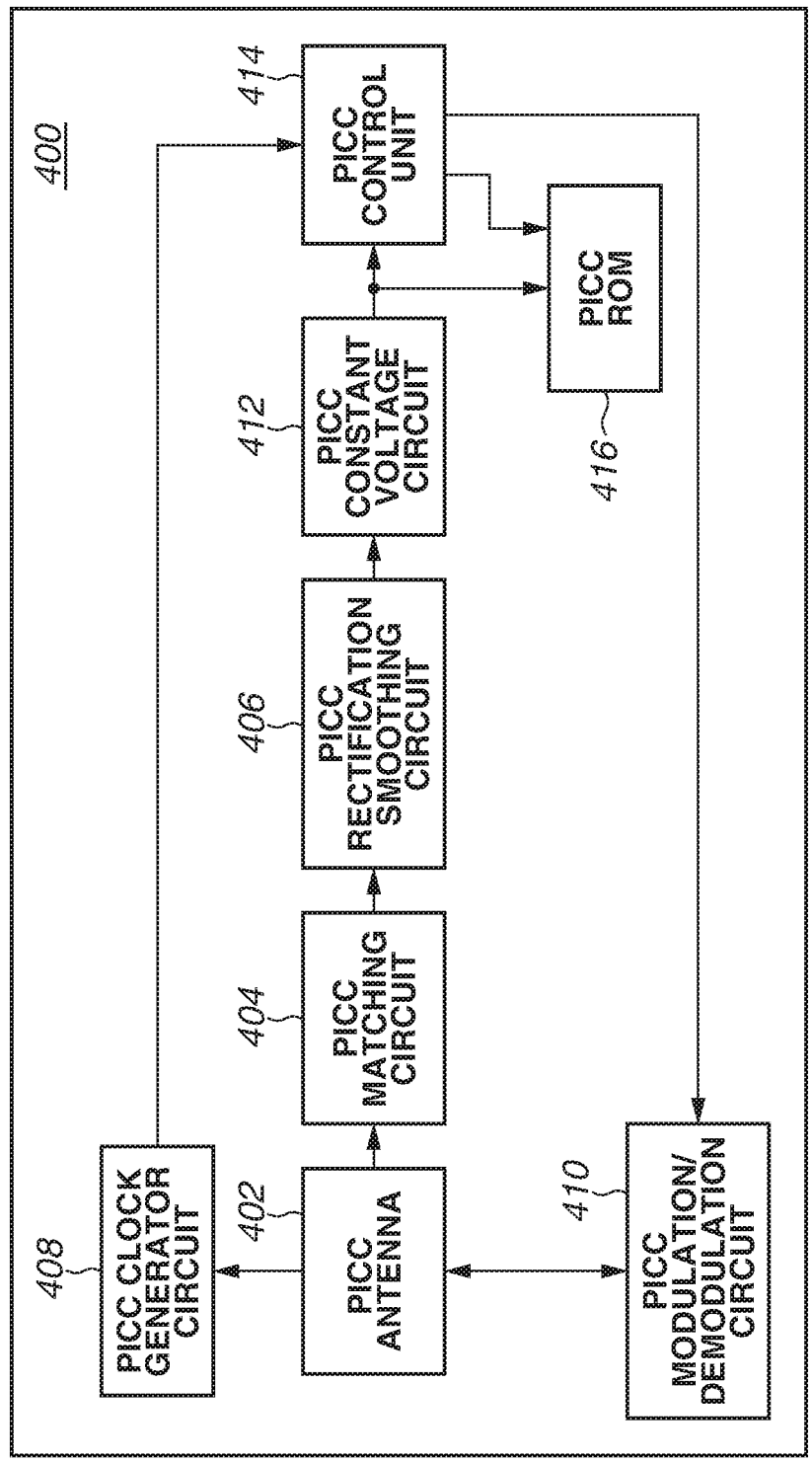
FIG. 4 is a schematic configuration block diagram of a contactless IC card.

FIG. 4 is a schematic configuration block diagram of a contactless IC card 400. The contactless IC card 400 is a card from/to which data can be read and written, by a contactless IC reader/writer function of other apparatus. The contactless IC card 400 is compliant with, for example, ISO/IEC 21481, which is an international standard of short-range wireless communication.

A proximity integrated circuit card (PICC) antenna 402 has, for example, a resonance frequency of about 13.56 MHz in the HF band. PICO represents a contactless IC card.

A PICC matching circuit 404 is a circuit for performing resonance frequency adjustment and impedance matching of the PICC antenna 402, which includes a PICC rectification smoothing circuit 406, a PICC clock generator circuit 408, and a PICC modulation/demodulation circuit 410.

The PICC rectification smoothing circuit 406 rectifies an AC voltage generated in the PICC antenna 402, thereby outputting a DC voltage. A PICC constant voltage circuit 412 generates a voltage necessary for a circuit block in a subsequent stage, from the output voltage of the PICC rectification smoothing circuit 406, and supplies the generated voltage to this circuit block.

A PICC control unit 414 comprehensively controls the contactless IC card 400. Further, according to an operation clock given from the PICC clock generator circuit 408, the PICC control unit 414 receives post-demodulation digital data from the PICC modulation/demodulation circuit 410, and supplies the PICC modulation/demodulation circuit 410 with data to be transmitted.

A PICC ROM 416 is a rewritable nonvolatile memory such as a flash memory for storing data of the contactless IC card 400, and the data thereof is read and written by a contactless IC reader/writer. To be more specific, the PICC control unit 414 reads/writes data from and to the PICC ROM 416.

Figure 5A:
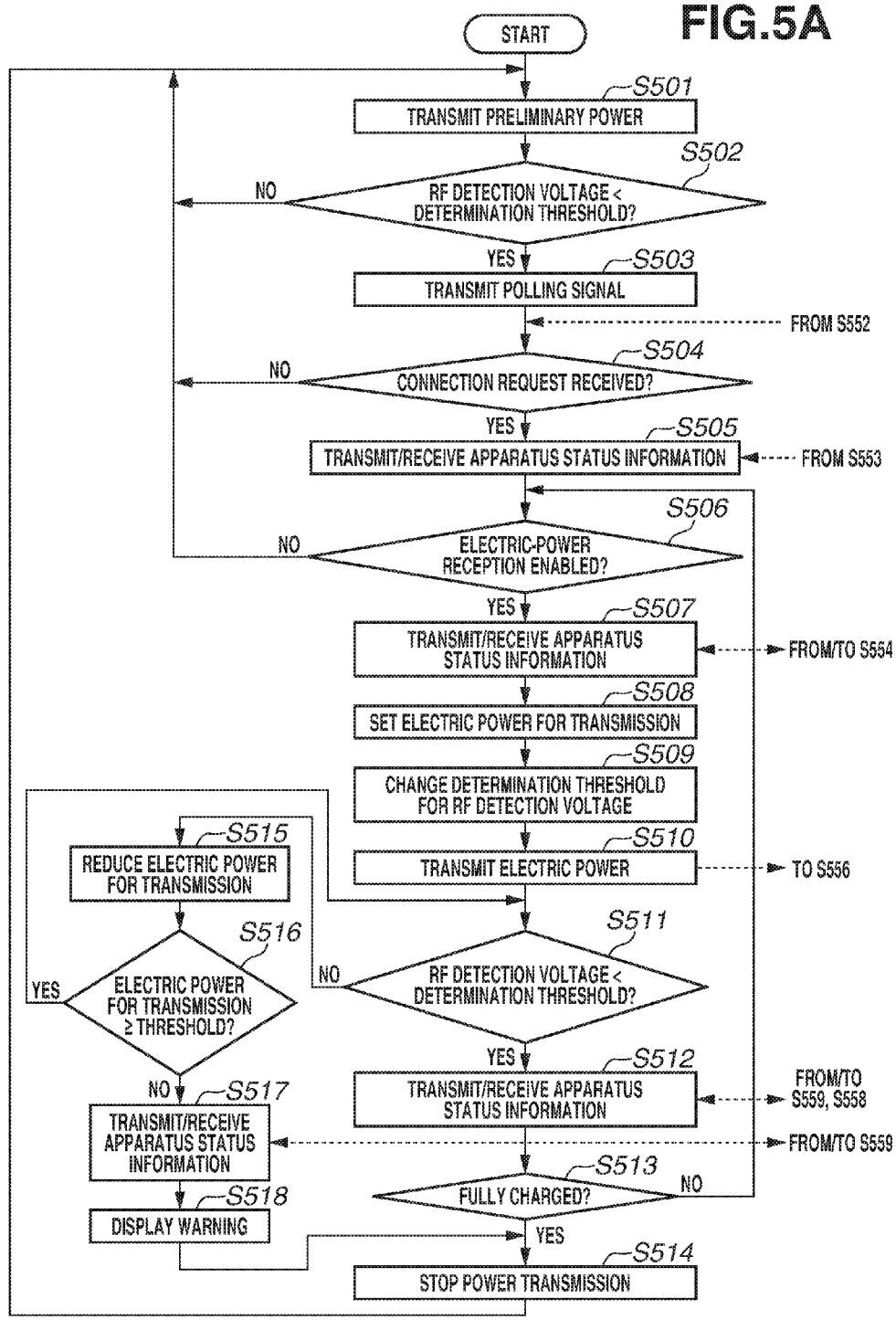

FIG. 5A illustrates a flowchart of a procedure of the power transmission apparatus 100 for wireless power transmission from the power transmission apparatus 100 to the power receiving apparatus 200. FIG. 5B illustrates a flowchart of a procedure of the power receiving apparatus 200. In the flowcharts illustrated in FIGS. 5A and 5B, the TX-CPU 102 executes processes of the power transmission apparatus 100, and the RX-CPU 202 executes processes of the power receiving apparatus 200, unless otherwise described.

FIGS. 6A and 6B each illustrate an example of apparatus status information transmitted and received between the power transmission apparatus 100 and the power receiving apparatus 200. FIG. 6A illustrates a data example in a case where power transmission is enabled, and FIG. 6B illustrates a data example in a case where power transmission is disabled. The apparatus status information includes "apparatus name", "power-reception enabled/disabled", "battery voltage", "battery full charge voltage", "remaining battery level", "maximum power reception electric power", "transmission/reception requested electric power", "transmission/reception set electric power", "reception electric power", and "power-transmission enabled/disabled" as illustrated in FIGS. 6A and 6B. The TX-CPU 102 and the RX-CPU 202 store this apparatus status information.

Figure 7A:
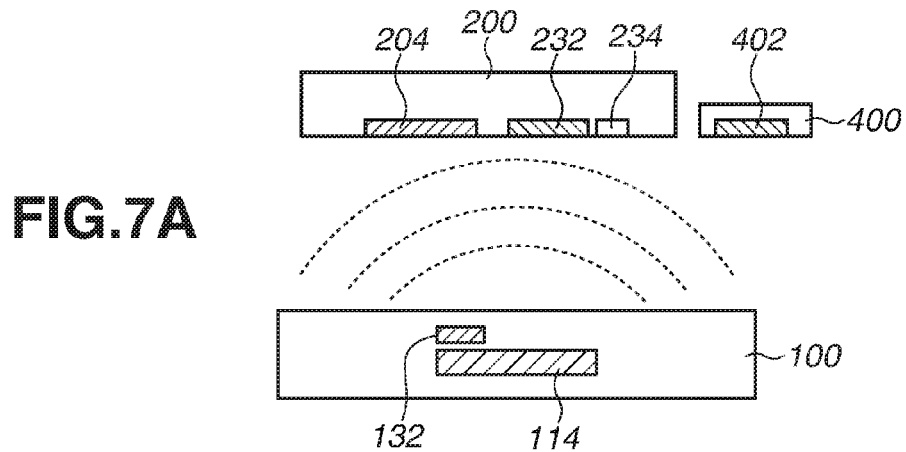
FIGS. 7A, 7B, and 7C each illustrate a layout example of the power transmission apparatus, the power receiving apparatus, and the contactless IC card.
Figure 7B:
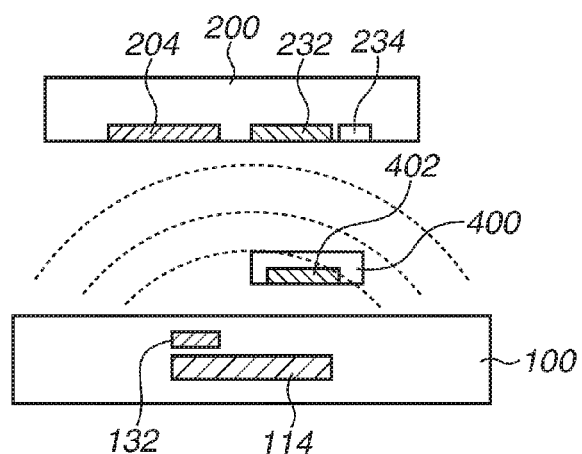
Figure 7C:
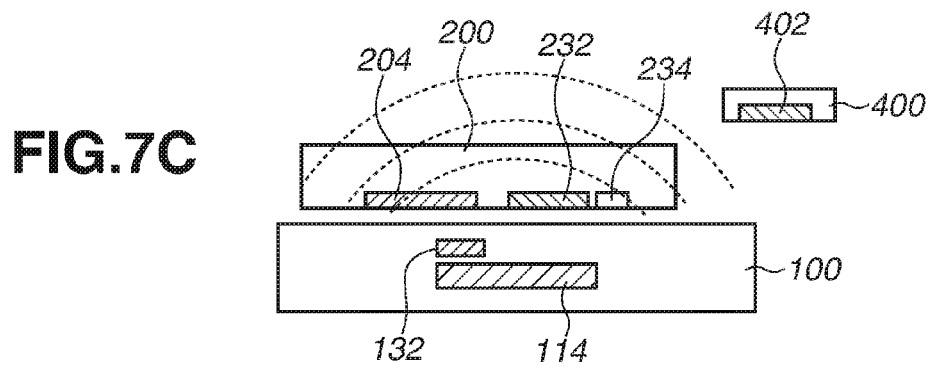

FIGS. 7A, 7B, and 7C each illustrate a layout example of the power transmission antenna 114, the power receiving antenna 204, and the contactless IC card 400. FIG. 7A illustrates the layout example in which the power receiving antenna 204 is located in front of the power transmission antenna 114, while the contactless IC card 400 is located beside the power receiving antenna 204. FIG. 7B illustrates the layout example representing a state in which the contactless IC card 400 is interposed between the power transmission antenna 114 and the power receiving antenna 204 in the positional relationship illustrated in FIG. 7A, FIG. 7C illustrates the layout example in which the contactless IC card 400 is located near the power receiving antenna 204, in a state where the power receiving antenna 204 is closely located to the power transmission antenna 114. In the layout example Illustrated in FIGS. 7A and 7B, the power transmission apparatus 100 has not started wireless power transmission to the power receiving apparatus 200, while preliminary power transmission described below is carried out. In the layout example illustrated in FIG. 7C, the power transmission apparatus 100 is executing wireless power transmission to the power receiving apparatus 200. The contactless IC card 400, located near the power transmission apparatus 100, is affected in no small measure by the electromagnetic influence of a power wave emitted from the power transmission apparatus 100. The contactless IC card 400 is an example of an electronic apparatus that is easily affected by the electromagnetic influence of a component of a predetermined frequency included in the electric power wave emitted from the power transmission apparatus 100.

Figure 8A:
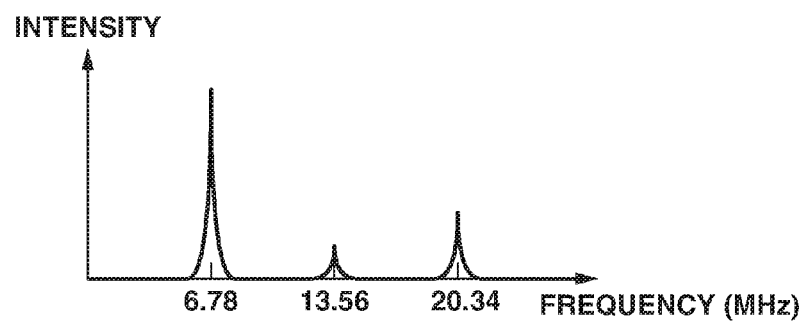
FIGS. 8A, 8B, and 8C illustrate a spectrum example detected by the RF detection unit, corresponding to the layout examples illustrated in FIGS. 7A, 7B, and 7C, respectively.
Figure 8B:
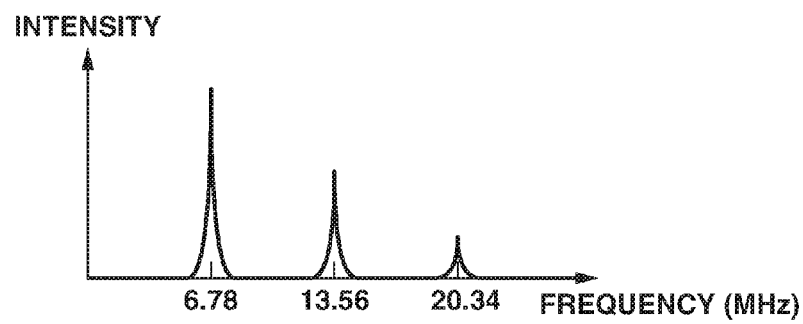
Figure 8C:
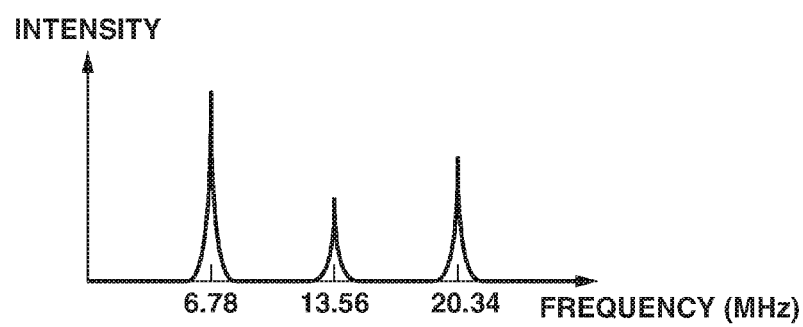

FIGS. 8A, 8B, and 8C illustrate a spectrum intensity detected by the RF detection unit 132, corresponding to the layout examples illustrated in FIGS. 7A, 7B, and 7C, respectively. Here, a fundamental of the electric power wave transmitted by the power transmission apparatus 100 is assumed to be 6.78 MHz. FIG. 8A illustrates a frequency distribution example of the spectrum intensity detected by the RF detection unit 132 in the layout example illustrated in FIG. 7A. FIG. 8B illustrates a frequency distribution example of the spectrum intensity detected by the RF detection unit 132 in the layout example illustrated in FIG. 7B. FIG. 8C illustrates a frequency distribution example of the spectrum intensity detected by the RF detection unit 132 in the layout example illustrated in FIG. 7C. In each of FIGS. 8A, 8B, and 8C, a horizontal axis indicates frequency, and a vertical axis indicates spectrum intensity.

In the spectrum intensity distribution illustrated in FIG. 8A corresponding to the layout example illustrated in FIG. 7A, the fundamental (6.78 MHz) has the highest spectrum intensity, a third-order harmonic (20.34 MHz) has the next highest spectrum intensity, and a second-order harmonic (13.56 MHz) has the lowest spectrum intensity. The second-order harmonic (13.56 MHz) exerts the strongest influence on the contactless card 400 equipped with an antenna having a resonance frequency of about 13.56 MHz. Therefore, the spectrum intensity of this frequency is suppressed to be low at the time of designing the power transmission apparatus 100.

In the spectrum intensity distribution illustrated in FIG. 8B corresponding to the layout example illustrated in FIG. 7B, as compared with the example illustrated in FIG. 8A, the spectrum intensity of a second-order harmonic (13.56 MHz) is higher, due to the influence of an approach of the contactless IC card 400. Usually, as for a peak that appears in spectrum intensity distribution, the peak of an even-order harmonic in the detected spectrum intensity is lower, and the peak of an odd-order harmonic in the detected spectrum intensity is relatively high, as illustrated in FIG. 8A. In other words, in a case where the detected spectrum intensity of the second-order harmonic (13.56 MHz) that is an even-order harmonic is high as illustrated in FIG. 8B, an approach of the contactless IC card 400 is expected. Therefore, there is a concern that electromagnetic influence may be exerted on the contactless IC card 400, depending on the value of this intensity.

In the spectrum intensity distribution illustrated in FIG. 8C corresponding to the layout example illustrated in FIG. 7C, the spectrum intensity of each of the second-order harmonic (13.56 MHz) and the third-order harmonic (20.34 MHz) is higher as compared with the example illustrated in FIG. 8A. This is due to the influence of the electric power received by the power receiving apparatus 200.

The operation of the power transmission apparatus 100 will be mainly described with reference to FIG. 5A.

In step S501, the power transmission apparatus 100 transmits preliminary power by controlling the power transmission circuit 108. The frequency of the preliminary power to be transmitted is 6.78 MHz, and the transmission electric power takes an arbitrary value, e.g., 1.0 W.

In step S502, the TX-CPU 102 compares a voltage value output from the RF detection unit 132 with a predefined determination threshold, thereby determining whether the voltage value is less than the determination threshold. This determination threshold is, for example, such voltage value that magnetic field intensity at 13.56 MHz at an interface between the inside and the outside of the power transmission apparatus 100 is equivalent to 6.0 A/m. Alternatively, the determination threshold is such a voltage value that antenna power of 13.56 MHz is equivalent to 0.25 W. Of course, this determination threshold is desirably equal to or less than a voltage, which corresponds to a value less than magnetic field intensity or antenna power that a generally marketed contactless IC card can tolerate.

If the TX-CPU 102 determines that the detection voltage indicating the RF component intensity detected by the RF detection unit 132 is less than the predefined determination threshold (YES in step S501), the operation proceeds to step S503. If the TX-CPU 102 determines that detection voltage is equal to more than the predefined determination threshold (NO in step S501), the operation returns to step S501 to continue the preliminary power transmission. In the layout example illustrated in FIG. 7A, the power receiving apparatus 200 and the contactless IC card 400 are not close to the power transmission apparatus 100. Therefore, the output voltage of the RF detection unit 132 is less than the determination threshold. On the other hand, in the layout example illustrated in FIG. 7B, the contactless IC card 400 is close to the power transmission apparatus 100. Therefore, the output voltage of the RF detection unit 132 of the power transmission apparatus 100 is equal to or more than the determination threshold.

In step S503, the TX-CPU 102 causes the TX communication unit 118 to transmit a polling signal. In step S504, the TX-CPU 102 determines whether there is a connection request from the power receiving apparatus 200. The TX communication unit 118 transmits, for example, a packet of a polling signal in an advertise mode of Bluetooth® low energy. Although detailed description of the protocol of Bluetooth® low energy is omitted, the power transmission apparatus 100 transmits the polling signal and the power receiving apparatus 200 performs scanning with the polling signal, so that both sides find each other so as to perform a connecting process. Connection of the short-range wireless communication therebetween is thus established.

If the TX-CPU 102 determines that there is no connection request from the power receiving apparatus 200 (NO in step S504), the operation returns to step S501 to continue the preliminary transmission. If the TX-CPU 102 determines that there is the connection request from the power receiving apparatus 200 (YES in step S504), the operation proceeds to step S505. In step S505, the TX-CPU 102 performs a connecting process with the power receiving apparatus 200 to acquire the item "power-reception enabled/disabled" which is the apparatus status information from the power receiving apparatus 200.

In step S506, the TX-CPU 102 determines whether the power receiving apparatus 200 is in an electric-power reception enabled state, based on "power-reception enabled/disabled" of the apparatus status information received in step S505. If "power-reception enabled/disabled" indicates "enabled" as shown in the apparatus status information of the example in FIG. 6A, the TX-CPU 102 determines that the power receiving apparatus 200 is in the electric-power reception enabled state (YES in step S506), and the operation proceeds to step S507. If the apparatus status information indicates "disabled", the TX-CPU 102 determines that the power receiving apparatus 200 is in a power reception disabled state (NO in step S506). The operation then returns to step S501 to continue the preliminary power transmission.

In step S507, the TX-CPU 102 acquires information about a battery status of the power receiving apparatus 200. Specifically, the TX-CPU 102 acquires each of battery-related items including "battery voltage", "battery full charge voltage", "remaining battery level", "maximum power reception", and "transmission/reception requested electric power" which is the apparatus status information, from the power receiving apparatus 200.

In step S508, the TX-CPU 102 sets transmission/reception set electric power, according to each of "battery voltage", "battery full charge voltage", "remaining battery level", "maximum power reception", and "transmission/reception requested electric power" which is apparatus status information of the power receiving apparatus 200 received in step S507. The transmission/reception set electric power to be set in step S508 Is determined according to the item "transmission/reception requested electric power" which is the apparatus status information from the power receiving apparatus 200. This transmission/reception set electric power is 2.8 W in the example illustrated in FIG. 6A. In step S508, the TX-CPU 102 sets electric power not exceeding power defined in the item "maximum power reception" which is the apparatus status information, as the transmission/reception set electric power.

In step S509, the TX-CPU 102 changes the determination threshold for the output voltage of the RF detection unit 132. For example, the TX-CPU 102 changes the determination threshold to a value higher than the threshold in step S502. Specifically, the TX-CPU 102 changes the determination threshold to such a voltage value that magnetic field intensity at 13.56 MHz at the interface between the inside and the outside of the power transmission apparatus 100 corresponds 7.5 A/m. Alternatively, the TX-CPU 102 may change the determination threshold to such a voltage value that antenna power at 13.56 MHz corresponds to 0.5 W. It is also desirable that the determination threshold after the change is equal to or less than a voltage value, which corresponds to a value less than magnetic field intensity or antenna power that a generally marketed contactless IC card can tolerate.

In step S510, the TX-CPU 102 enables output of the power transmission circuit 108, by controlling the TX matching circuit 112 to enter an impedance matching state suitable for wireless power transmission of the output power of the power transmission circuit 108 from the power transmission antenna 114 to the power receiving apparatus 200. The power transmission apparatus 100 thereby performs electromagnetic emission of a power wave of normal wireless power transmission, from the power transmission antenna 114 toward the power receiving apparatus 200. Although hereinafter not mentioned in the description, in the wireless power transmission from the power transmission apparatus 100 to the power receiving apparatus 200, the TX-CPU 102 controls the TX matching circuit 112 to enter the impedance matching state to enable wireless transmission of necessary electric power.

In step S511, the TX-CPU 102 reads a detection voltage value of the RF detection unit 132, and determines whether the detection voltage value is less than the determination threshold changed in step S509. If the detection voltage of the RF detection unit 132 is less than the determination threshold (YES in step S511), the operation proceeds to step S512. In step S512, the TX-CPU 102 acquires each of "battery voltage", "battery full charge voltage", and "remaining battery level" of the apparatus status information, from the power receiving apparatus 200.

In step S513, the TX-CPU 102 determines whether the battery 214 of the power receiving apparatus 200 is at a full charge level, based on the information indicating "battery voltage" and "battery full charge voltage", or the information indicating "remaining battery level", which is the apparatus status information acquired in step S512. If the battery 214 is at the full charge level (YES in step S513), the operation proceeds to step S514. In step S514, the TX-CPU 102 stops the wireless power transmission, and then returns to step S501 to start a wireless power transmission process for another power receiving apparatus. If the battery 214 is not at the full charge level (NO in step S513), the operation returns to step S507 so that the TX-CPU 102 acquires the apparatus status information from the power receiving apparatus 200.

If the detection voltage of the RF detection unit 132 is equal to or more than the determination threshold (NO in step S511), the operation proceeds to step S515. In step S515, the TX-CPU 102 reduces the wireless electric power to be transmitted to the power receiving apparatus 200, by controlling the power transmission circuit 108. The TX-CPU 102 may reduce the wireless electric power to be transmitted, by an arbitrary value defined in the power transmission apparatus 100, e.g., 0.05 W, or may reduce the wireless electric power to be transmitted, to 0 W at once, each time the operation passes through step S515.

For example, in the layout example illustrated in FIG. 7C, the power transmission apparatus 100 is in a state of transmitting electric power to the receiving apparatus 200 in the normal wireless power transmission. In this state, whether the detection voltage of the RF detection unit 132 is less than the determination threshold depends on the power receiving apparatus 200. In other words, the detection voltage of the RF detection unit 132 is less than the determination threshold, if the spectrum intensity of the harmonic (13.56 MHz) is not high, even if there is influence of the power receiving apparatus 200. On the other hand, when the influence of the power receiving apparatus 200 is large, and the spectrum intensity of the harmonic (13.56 MHz) is high, the detection voltage of the RF detection unit 132 is equal to or more than the determination threshold. The influence of the power receiving apparatus 200 varies according to a circuit structure of the power transmission apparatus 100 and a circuit structure of the power receiving apparatus 200. However, it is possible to restrict the wireless power transmission dynamically and appropriately by the RF detection unit 132 detecting the influence of the harmonic (13.56 MHz).

In step S516, the TX-CPU 102 determines whether the wireless electric power to be transmitted from the power transmission apparatus 100 is equal to or more than a threshold, based on the output power of the power transmission circuit 108. This threshold may be an arbitrary value defined in the power transmission apparatus 100. For example, the threshold may be 50% of "transmission/reception set electric power" set in step S508, or 0.25 W of "transmission/reception set electric power" may be used as the threshold. When the wireless electric power output from the power transmission apparatus 100 is equal to or higher than the threshold (YES in step S516), the operation returns to step S511. When the wireless electric power to be transmitted from the power transmission apparatus 100 is less than the threshold (NO in step S516), the operation proceeds to step S517. In step S517, the TX-CPU 102 sets "power-transmission enabled/disabled" of the apparatus status information to "disabled", and transmits this setting to the power receiving apparatus 200. In step S517, the power transmission apparatus 100 transmits the apparatus status information in which "power-transmission enabled/disabled" is changed to "disabled" as illustrated in FIG. 6B, for example, to the power receiving apparatus 200.

Figure 9A:
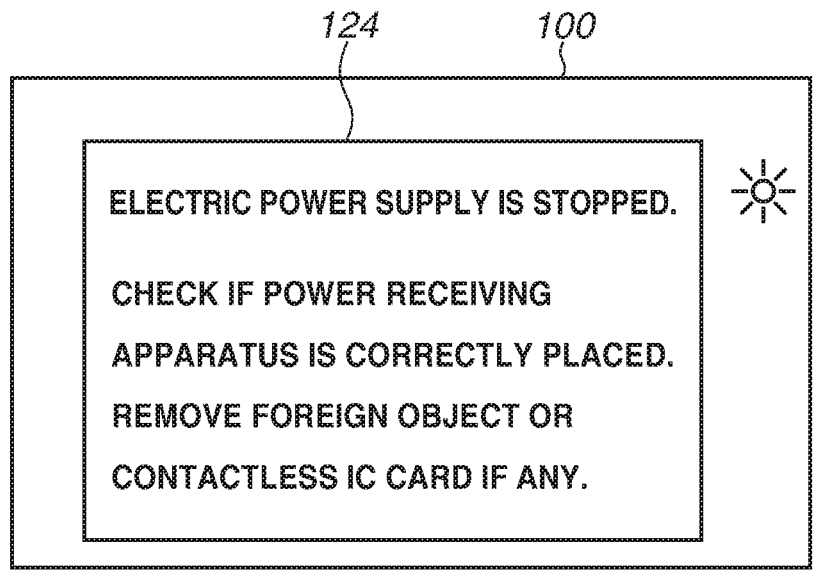
FIGS. 9A and 9B illustrate a warning display example in the power transmission apparatus, and a warning display example in the power receiving apparatus, respectively.

In step S518, the TX-CPU 102 displays a warning for notifying the user of the power transmission stoppage as illustrated in FIG. 9A, on the TX display unit 124. In step S514, the TX-CPU 102 stops the wireless power transmission, and then returns to step S501 to start a wireless power transmission process with another power receiving apparatus.

The operation of the power receiving apparatus 200 will be described with reference to FIG. 5B. In step S551, the RX-CPU 202 of the power receiving apparatus 200 waits until the RX communication unit 222 receives a polling signal of short-range wireless communication from the power transmission apparatus 100. When the polling signal is received (YES in step S551), the operation proceeds to step S552. In step S552, the RX-CPU 202 transmits a connection request to the origin of the output of the polling signal (here, the power transmission apparatus 100), via the RX communication unit 222, the RX communication matching circuit 224, and the RX communication antenna 226. For example, this connection request is issued as a response to an advertise packet in an initiating mode of Bluetooth® low energy.

In step S553, the RX-CPU 202 performs a connecting process with the power transmission apparatus 100, thereby transmitting "power-reception enabled/disabled" of the apparatus status information to the power transmission apparatus 100. Upon completion of the process in step S505 in the power transmission apparatus 100 and the process in step S553 in the power receiving apparatus 200, the power transmission apparatus 100 and the power receiving apparatus 200 enter a connection mode.

In step S554, the RX-CPU 202 transmits each of "battery voltage", "battery full charge voltage", "remaining battery level", "maximum power reception", and "transmission/reception requested electric power" of the apparatus status information, to the power transmission apparatus 100 to notify the power transmission apparatus 100 of a battery status.

In step S555, the RX-CPU 202 connects output of the RX constant voltage circuit 210 to the charge control circuit 212, thereby setting reception electric power in the charge control circuit 212, according to "transmission/reception requested electric power" which is the apparatus status information transmitted in step S554. The RX-CPU 202 also sets the RX matching circuit 206 to a state suitable for reception of the wireless electric power from the power transmission apparatus 100. At the time of receiving the electric power, the RX-CPU 202 adaptively controls the impedance matching value of the RX matching circuit 206 according to the reception electric power. Upon completion of the process in step S508 in the power transmission apparatus 100 and the process in step S555 in the power receiving apparatus 200, the power transmission apparatus 100 enters a state where power transmission can be performed, and the power receiving apparatus 200 enters a state where wirelessly transmitted electric power can be received. In step S556, the RX-CPU 202 starts receiving the electric power output from the power transmission apparatus 100.

In step S557, the RX-CPU 202 determines the charging state of the battery 214, specifically, whether the battery 214 is in a full charge state. If the battery 214 is in the full charge state (YES in step S557), the operation proceeds to step S558. In step S558, the RX-CPU 202 notifies that the battery 214 of the power receiving apparatus 200 is in the full charge state. Here, the RX-CPU 202 transmits each of "battery voltage", "battery full charge voltage", and "remaining battery level" of the apparatus status information, to the power transmission apparatus 100, by using the RX communication unit 222. The RX-CPU 202 then changes "power-reception enabled/disabled" of the apparatus status information from "enabled" to "disabled", and then the process ends.

When the battery 214 is not in the full charge state (NO in step S557), the operation proceeds to step S559. In step S559, the RX-CPU 202 notifies the power transmission apparatus 100 that the battery 214 of the power receiving apparatus 200 is not in the full charge state. Here, the RX-CPU 202 transmits "battery voltage", "battery full charge voltage", and "remaining battery level" of the apparatus status information, to the power transmission apparatus 100, by using the RX communication unit 222. Further, in step S559, the RX-CPU 202 acquires "power-transmission enabled/disabled" of apparatus status information from the power transmission apparatus 100, in order to acquire an electric power transmission state of the power transmission apparatus 100. Based on this "power-transmission enabled/disabled" from the power transmission apparatus 100, the RX-CPU 202 can recognize whether the power transmission apparatus 100 is in the state where wireless power transmission can be performed.

If "power-transmission enabled/disabled" of the apparatus status information indicates "enabled" as in the apparatus status information example illustrated in FIG. 6A (YES in step S560), the RX-CPU 202 determines that the power transmission apparatus 100 is in the power-transmission enabled state. In this case, the operation returns to step S554 and the RX-CPU 202 exchanges the apparatus status information with the power transmission apparatus 100.

Figure 9B:
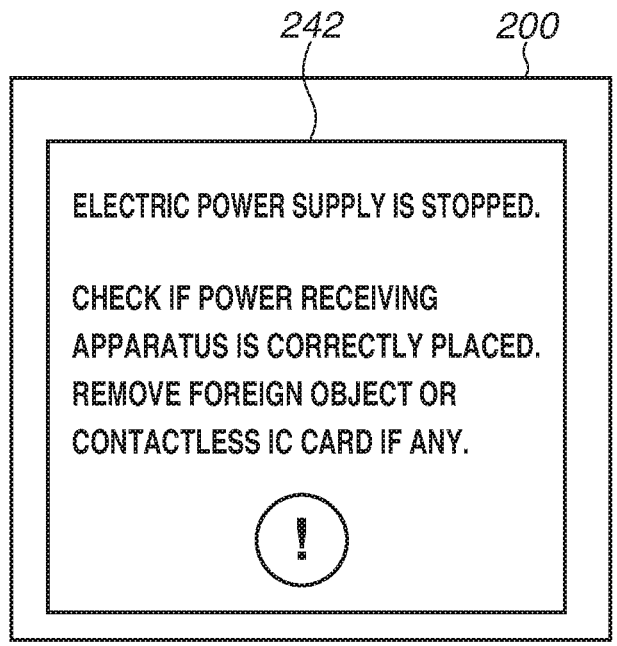

On the other hand, when "power-reception enabled/disabled" indicates "disabled" (NO in step S560), the RX-CPU 202 determines that the power transmission apparatus 100 is in the power-transmission disabled state, and the operation proceeds to step S561. In step S561, the RX-CPU 202 displays a warning as illustrated in FIG. 9B to notify the user of the stoppage of the wireless power transmission, in the RX display unit 242, and then the operation returns to step S551.

According to the first exemplary embodiment, the RF detection unit 132 of the power transmission apparatus 100 detects the amount of the generated harmonic (13.56 MHz), which influences the contactless IC card 400, of the electric power wave emitted from the power transmission apparatus 100. The RF detection unit 132 dynamically controls the amount of electric power for power transmission, according to the result of this detection. Such processing can reduce influence such as heat on a contactless IC card equipped with an antenna having resonance frequency of about 13.56 MHz.

Figure 10:
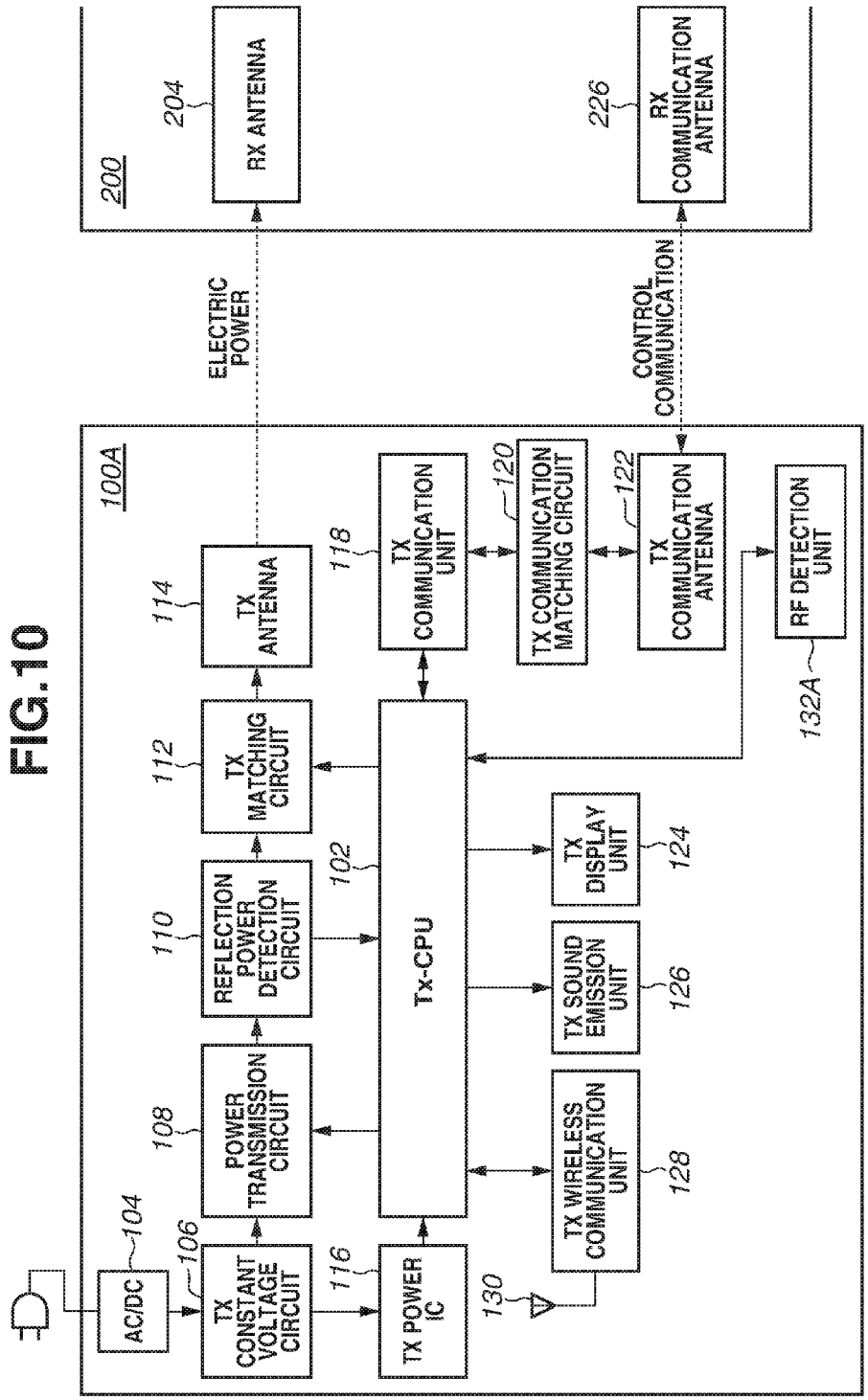
FIG. 10 is a schematic configuration block diagram of a power transmission apparatus according to a second exemplary embodiment.

A second exemplary embodiment will be described. According to the second exemplary embodiment, a band pass filter (BPF) circuit is used for extraction of a frequency component that adversely influences a contactless IC card. FIG. 10 illustrates a schematic configuration block diagram of a power transmission apparatus 100A according to the second exemplary embodiment. In the power transmission apparatus 100A illustrated in FIG. 10, the same components as the components of the power transmission apparatus 100 are provided with the same reference characters as the power transmission apparatus 100. A power receiving apparatus has a configuration similar to the configuration of the power receiving apparatus 200, and thus will not be described.

Figure 11:
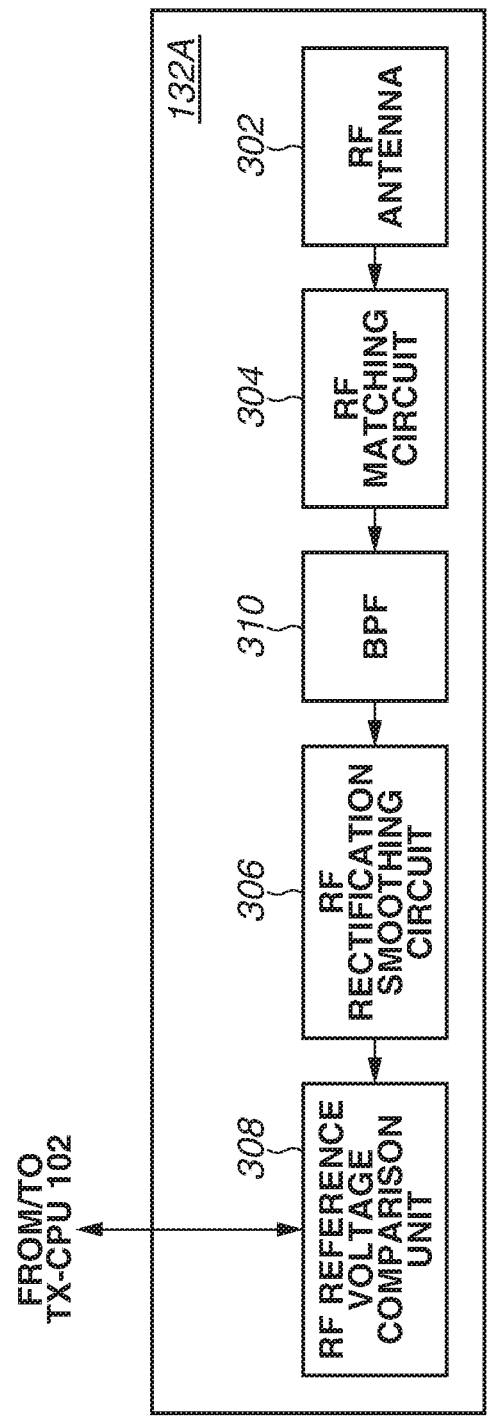
FIG. 11 is a schematic configuration block diagram of an RF detection unit of the power transmission apparatus illustrated in FIG. 10.

The power transmission apparatus 100A illustrated in FIG. 10 includes, in place of the RF detection unit 132, an RF detection unit 132A, which has a configuration different from the configuration of the RF detection unit 132. FIG. 11 illustrates a schematic configuration block diagram of the RF detection unit 132A. As illustrated in FIG. 11, the RF detection unit 132A is configured such that a BPF circuit 310 is inserted between the RF matching circuit 304 and the RF rectification smoothing circuit 306 of the RF detection unit 132. In FIG. 11, the same components as the components illustrated in FIG. 3 are provided with the same reference characters as FIG. 3.

The BPF circuit 310 has a bandwidth in a range of frequencies near 13.56 MHz. For example, it allows, from the output of the RF matching circuit 304a, a wave of frequencies of ±2 MHz centering on 13.56 MHz, to selectively pass. The REF circuit 310 may be configured as a passive filter circuit including only a passive device, or may be configured as an active filter circuit by using an active device. Further, the BPF circuit 310 may be a circuit having a Fourier transform function, e.g., circuit that can perform fast Fourier transform (FFT). Furthermore, the BPF circuit 310 may have a circuit structure in which a passing frequency and a bandwidth thereof can be adjusted by the control of the TX-CPU 102.

A procedure of wireless power transmission to be performed between the power transmission apparatus 100A and the power receiving apparatus 200 is similar to procedure according to the first exemplary embodiment. However, in the determination in each of step S502 and step S511, a detection output of the RF detection unit 132A is used in place of the detection output of the RF detection unit 132.

According to the present exemplary embodiment, since the BPF circuit 310 is inserted into the RF detection unit 132A, it is possible to detect more reliably the intensity of the frequency component, which greatly influences a contactless IC card, from the electric power wave in the wireless power transmission. Therefore, the influence on the contactless IC card can be reduced since the intensity of the electric power wave to be output from the power transmission apparatus 100A is more reliably controlled.

Figure 12:
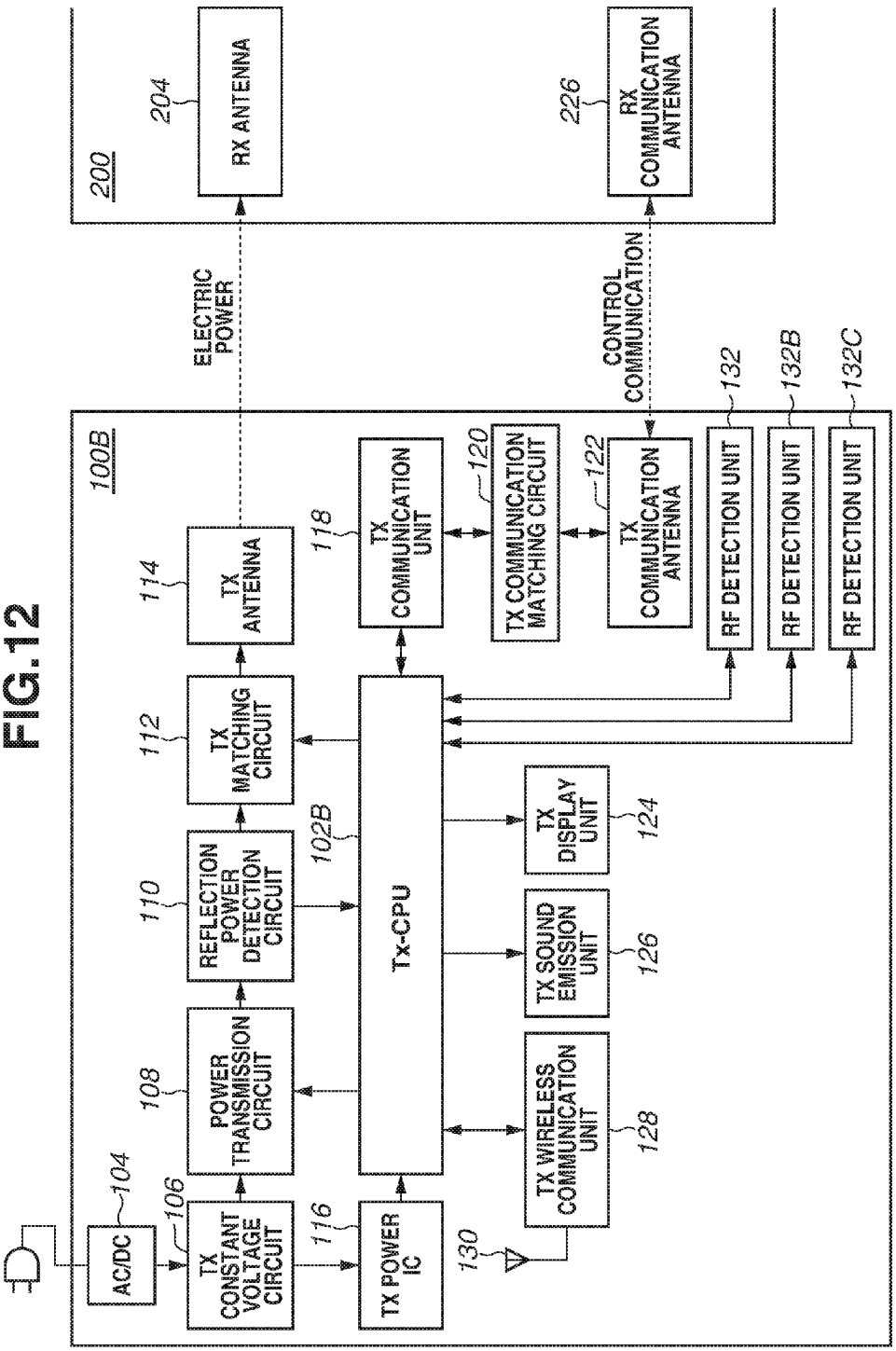
FIG. 12 is a schematic configuration block diagram of power transmission apparatus according to a third exemplary embodiment.

A third exemplary embodiment will be described below. Specifically, a power transmission apparatus configured to detect RF component intensity at a plurality of different points will be described. FIG. 12 illustrates schematic configuration block diagram of a power transmission apparatus 100B thus modified. The power transmission apparatus 100B illustrated in FIG. 12 includes RF detection units 132B and 132C, in addition to the RF detection unit 132. The RF detection units 132, 132B, and 132C have the similar configurations. The same components as the components illustrated in FIG. 1 are provided with the same reference characters as FIG. 1, and will not be described in detail. However, a function of a TX-CPU 102B or a function implemented by a program running on the TX-CPU 102B is the function of the TX-CPU 102 modified to enable evaluation of a detection result of the RF detection units 132, 132B, and 132C.

A power receiving apparatus for the power transmission apparatus 100B has the same configuration as the configuration of the power receiving apparatus 200. A sequence of wireless power transmission between the power transmission apparatus 100B and the power receiving apparatus 200 is similar to the sequence described with reference to FIGS. 5A and 5B. However, in the RF detect determination process in each of step S502 and step S511, "RF detection voltage<determination threshold" holds if the detection result of any of the RF detection units 132, 132B, and 132C is less than the determination threshold.

Figure 13A:
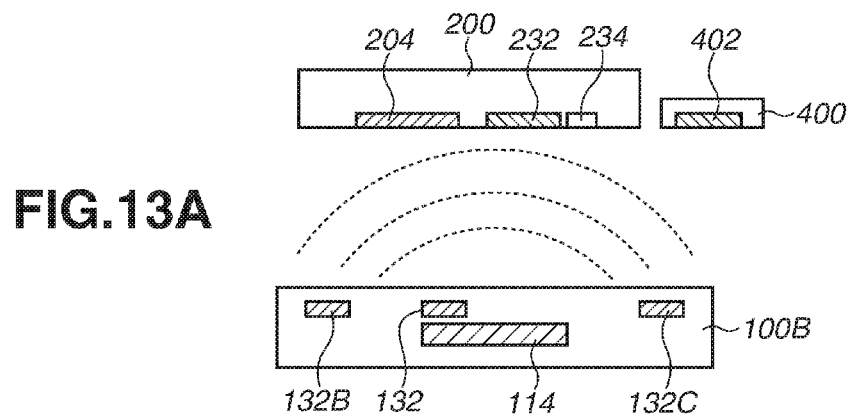
FIGS. 13A, 13B, and 13C each illustrate a layout example of the power transmission apparatus, the power receiving apparatus, and the contactless IC card, in a case where the power transmission apparatus illustrated in FIG. 12 is used.
Figure 13B:
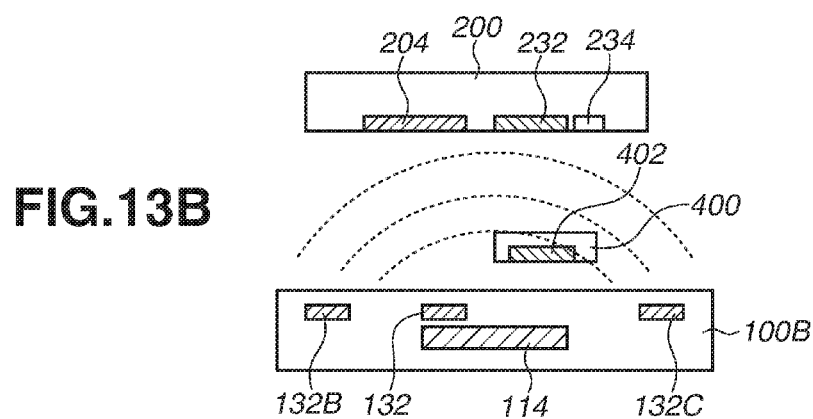
Figure 13C:
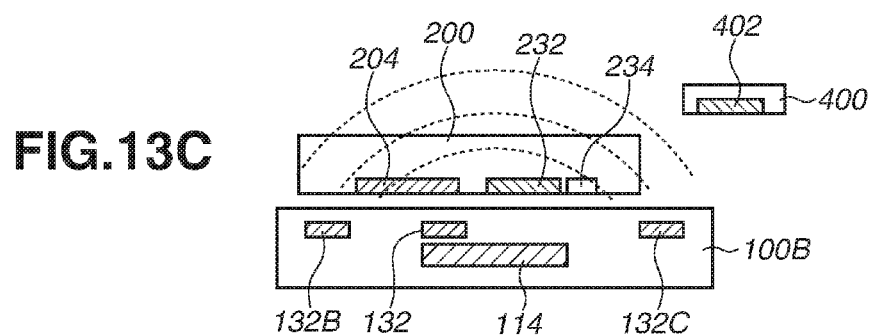

FIGS. 13A, 13B, and 13B illustrate a layout example of the power transmission apparatus 100B (its power transmission antenna 114, and the RF detection units 132, 132B, and 132C), the power receiving apparatus 200 (the power receiving antenna 204), and the contactless IC card 400. The RF detection unit 132 detects the RF intensity near the power transmission antenna 114, and the RF detection units 132B and 132C detect the RF intensity at a position laterally separated from the power transmission antenna 114, as illustrated in FIGS. 13A, 13B, 13C. The RF detection unit 132 disposed near the power transmission antenna 114 can effectively detect influence of a harmonic exerted by the power receiving apparatus 200.

FIG. 13A illustrates the layout example in which the power receiving antenna 204 is located in front of the power transmission antenna 114, while the contactless IC card 400 is located beside the power receiving antenna 204. FIG. 13B illustrates the layout example showing a state where the contactless IC card 400 is interposed between the power transmission antenna 114 and the power receiving antenna 204 in the positional relationship illustrated in FIG. 13A. FIG. 13C illustrates the layout example in which the contactless IC card 400 is located near the power receiving antenna 204, in a state where the power receiving antenna 204 is provided close to the power transmission antenna 114. In the layout example illustrated in each of 13A and 13B, the power transmission apparatus 100B has not started wireless power transmission to the power receiving apparatus 200, while performing preliminary power transmission to be described below. In the layout example illustrated in FIG. 13C, the power transmission apparatus 100B is executing wireless power transmission to the power receiving apparatus 200.

FIGS. 14A, 14B, and 14C illustrate a spectrum example of the RF intensity detected in the RF detection units 132 and 132C. Also in this case, fundamental of a power wave transmitted by the power transmission apparatus 100B is assumed to be 6.78 MHz. Further, a second-order harmonic shows a frequency of 13.56 MHz, and a third-order harmonic shows a frequency of 20.34 MHz. FIG. 14A corresponds to FIG. 13A, FIG. 14B corresponds to FIG. 13B, and FIG. 14C corresponds to FIG. 13C. In each of FIGS. 14A, 14B, and 14C, an upper part illustrates a spectrum example of the RF intensity detected by the RF detection unit 132, and a lower part illustrates a spectrum example of the RF intensity detected by the RF detection unit 132C.

In the layout example illustrated in FIG. 13A, the power receiving apparatus 200 and the contactless IC card 400 are located away from the power transmission apparatus 100B, and the power transmission apparatus 100B is in the state of performing the transmission of the preliminary power without starting the normal wireless power transmission for the power receiving apparatus 200. As illustrated in FIG. 14A corresponding to the layout example of FIG. 13A, the fundamental (6.78 MHz) has the highest spectrum intensity, the third-order harmonic (20.34 MHz) has the second highest spectrum intensity, and the second-order harmonic (13.56 MHz) has the lowest spectrum intensity. When the detection results of the respective RF detection units 132 and 132C are compared, the spectrum intensity of the fundamental of the RF detection unit 132C is lower than the spectrum intensity of the fundamental of the RF detection unit 132. This is because the RF detection unit 132C is relatively away from the power transmission antenna 114.

In the layout example illustrated in FIG. 13B, the power receiving apparatus 200 is away from the power transmission apparatus 100B, and the power transmission apparatus 100B is in state of performing the transmission of the preliminary power without starting the normal wireless power transmission for the power receiving apparatus 200. The contactless IC card 400 is at a position closer to the power transmission apparatus 100B than to the power receiving apparatus 200. At this moment, as illustrated in FIG. 14B, the spectrum intensity of the second-order harmonic (13.56 MHz) is higher, as compared with the spectrum intensity of the second-order harmonic (13.56 MHz) in FIG. 14A, due to the influence of the approach of the contactless IC card 400.

In the layout example illustrated in FIG. 13C, the power transmission apparatus 100B has started the normal wireless power transmission to the power receiving apparatus 200, and the contactless IC card 400 is also located near the power transmission apparatus 100B. At this moment, as illustrated in FIG. 14C, the spectrum intensity of each of the second-order harmonic (13.56 MHz) and the third-order harmonic (20.34 MHz) is higher as compared with the corresponding spectrum intensity in FIG. 14A, due to the influence of the electric power received by the power receiving apparatus 200.

In the layout illustrated in FIG. 13C, the RF detection unit 132C detects the influence of the nearby contactless IC card 400 on the second-order harmonic (13.56 MHz), more easily than the RF detection unit 132. As a result, as illustrated in FIG. 14C, the spectrum intensity of the second-order harmonic (13.56 MHz) in the detection result of the RF detection unit 132C is higher than the spectrum intensity of the second-order harmonic (13.56 MHz) of the RF detection unit 132.

According to the present embodiment, the RF detection units 132B and 132C have the same internal configuration as the configuration of the RF detection unit 132, but each of the detection units may have a configuration different from the configuration of the RF detection unit 132. The RF detection unit 132A may be provided in place of the RF detection unit 132, and the RF detection units 132B and 132C may each have the same configuration as the RF detection unit 132A.

The exemplary embodiment having the three RF detection units 132, 132B, and 132C is described, but of course, two RF detection units, or four or more RF detection units may be provided.

The determination thresholds for the respective detection voltages of the respective RF detection units 132, 132B, and 132C may be the same or may be different. For example, the determination threshold for each of the RF detection units 132B and 132C may be set to correspond to a value less than magnetic field intensity or antenna power that a generally marketed contactless IC card can tolerate.

According to the third exemplary embodiment, the RF signal intensity is detected at the position close to and the position away from the power transmission antenna. Therefore, it is possible to distinctively detect a harmonic generation factor at near the power transmission antenna and a harmonic generation factor at a position away from the power transmission antenna. Accordingly, for example, even when the power receiving apparatus is located close to or near the power transmission antenna, an approach of the contactless IC card can be identified, and the transmission power of the wireless power transmission can be dynamically controlled and restricted.

A fourth exemplary embodiment will be described. According to the fourth exemplary embodiment, an electromagnetic wave that may exert influence such as heat on the contactless IC card 400 is detected on a power receiving apparatus side, and wireless power transmission from a power transmission apparatus to the power receiving apparatus is controlled according to the result of this detection. A configurations of the power transmission apparatus and the power receiving apparatus according to the fourth exemplary embodiment are identical to configuration of the power transmission apparatus 100 and configuration of the power receiving apparatus 200 described in the first exemplary embodiment. In other words, it can be said that the fourth exemplary embodiment described below is an example representing different control operation from the power transmission apparatus 100 and the power receiving apparatus 200.

Figure 15B:
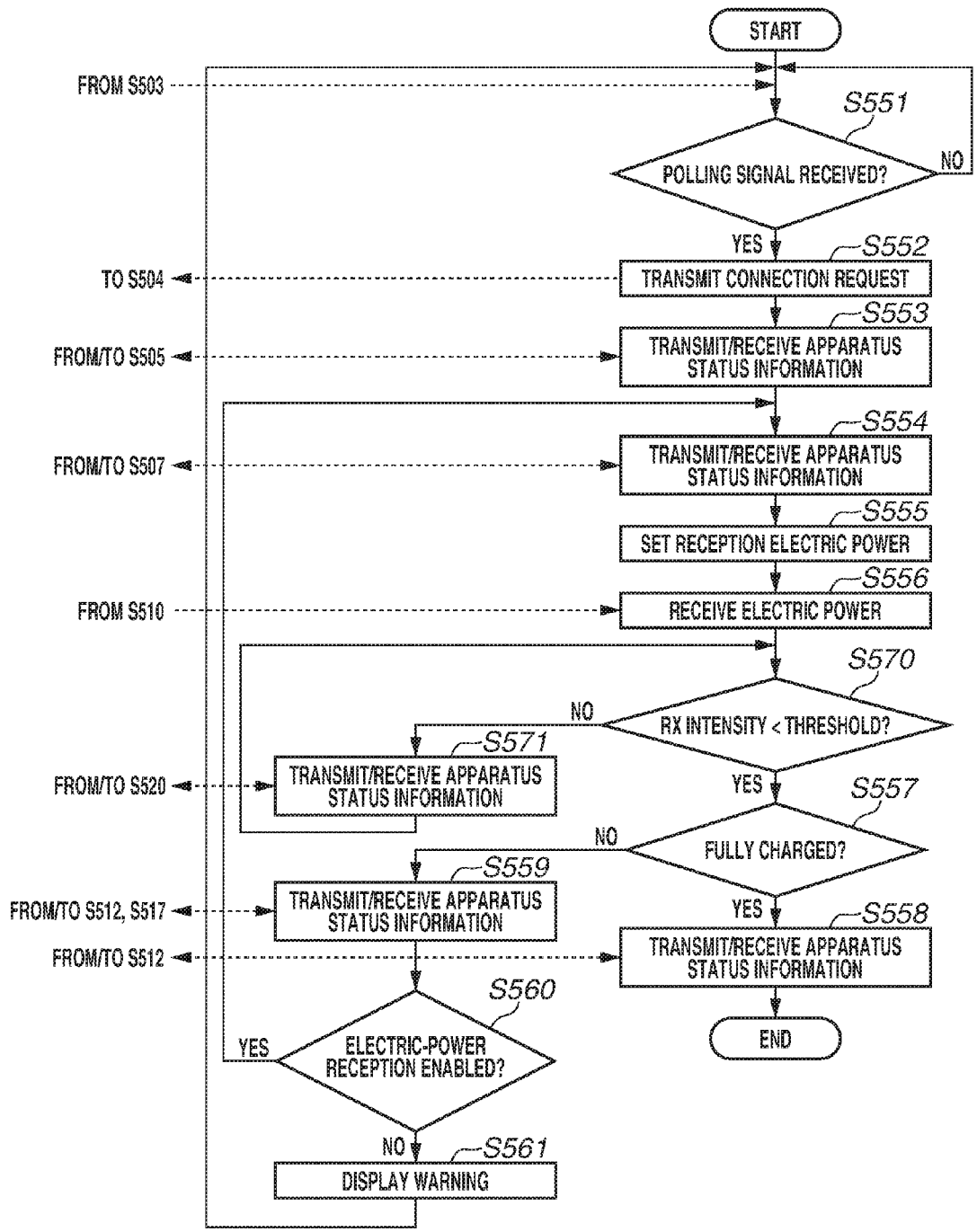

FIG. 15A illustrates an operation flowchart on the power transmission apparatus side, and 15B illustrates an operation flowchart on the power receiving apparatus side. In FIGS. 15A and 15B, the same processes as the processes in the flowcharts illustrated in FIGS. 5A and 5B are provided with e same reference characters as 5A and 5B, and will not be described in detail.

FIGS. 16A and 16B each illustrate an example of apparatus status information transmitted and received between the power transmission apparatus and the power receiving apparatus according to the fourth exemplary embodiment. An item "antenna overvoltage warning" is added to the apparatus status information illustrated in FIGS. 6A and 6B.

The operation of the power transmission apparatus 100 will be described with reference to FIG. 15A. In the flowchart illustrated in FIG. 15A, step S520 and step S521 are inserted between step S510 and step S511. In other words, operation from step S501 to step S510 is the same as corresponding operation in the power transmission apparatus 100 according to the first exemplary embodiment.

In step S520 following step S510, the TX-CPU 102 receives the apparatus status information including "antenna overvoltage warning" from the power receiving apparatus 200. In step S521, the TX-CPU 102 determines whether the overvoltage warning information about the RX communication antenna 232 notified from the power receiving apparatus 200, according to "antenna overvoltage warning" of the apparatus status information received in step S510. If overvoltage warning is received from the power receiving apparatus 200 (NO in step S521), the operation proceeds to step S511 to determine whether the RF detection voltage is less than the determination threshold. On the other hand, if the overvoltage warning is received from the power receiving apparatus 200 (YES in step S521), the operation proceeds to step S515 and the electric polder to be wirelessly output is reduced.

Processes after step S511 and after step S515 are similar to the corresponding processes in the operation described with reference to FIG. 5A. However, if the transmission electric power is equal to or higher than the threshold in step S516, the operation returns to step S520.

The operation of the power receiving apparatus 200 will be described with reference to FIG. 15B. In the flowchart illustrated in FIG. 15B, step S570 and step S571 are inserted between step S556 and step S557. In other words, the operation from step S551 to step S556 is the same as the corresponding operation in the power receiving apparatus 200 according to the first exemplary embodiment.

After reception of the electric power wirelessly transmitted from the power transmission apparatus 100 has started in step S556, the operation proceeds to step S570. In step S570, the RX-CPU 202 of the receiving apparatus 200 determines whether a voltage value measured by the RX voltage measurement circuit 234 is less than a threshold. For example, this threshold is a voltage value not exceeding a voltage tolerable by the contactless IC 228 of the power receiving apparatus 200. Alternatively, this threshold is such a voltage value that magnetic field intensity at 13.56 MHz of the RX communication antenna 232 having the resonance frequency of about 13.56 MHz in the HF band does not exceed 7.5 A/m. The resonance frequency of about 13.56 MHz in the HF band is the same as that of the contactless IC card 400. More generally, the voltage threshold value in the determination in step S570 is desirably a voltage value equal to or less than magnetic field intensity that is tolerable by a contactless IC card widely available.

If the output voltage of the RX voltage measurement circuit 234 is less than the threshold (YES in step S570), the operation proceeds to step S557. On the other hand, it the output voltage of the RX voltage measurement, circuit 234 is equal to more than the threshold (NO in step S570), the operation proceeds to step S571. In step S571, the RX-CPU 202 transmits the apparatus status information, in which "antenna overvoltage warning" is set as the apparatus status information to "present", to power transmission apparatus 100, and then the operation returns to step S570.

By performing such control, when the power-transmission electric power output from the power transmission apparatus 100 is large enough to exert adverse influence such as heat generation on a nearby contactless IC card, the power receiving apparatus 200 notifies the power transmission apparatus 100 of such information. The power transmission apparatus 100 can avoid or reduce the adverse influence on the nearby contactless IC card, by lowering the power-transmission electric power according to this notification.

A fifth exemplary embodiment will be described below. According to the above-described exemplary embodiments, Bluetooth® low energy is used in the transmission and reception of the control data between the power transmission apparatus and the power receiving apparatus, but other types of short-range wireless communication can be used. For example, the present invention can also be implemented by performing wireless communication using protocol of ISO/IEC 21481, ISO/IEC 14443, or ISO/IEC 15693. To be compliant with these protocols, the power transmission apparatus 100 is configured to have a contactless IC reader/writer function, and the power receiving apparatus 200 is configured to have a contactless IC function. IEEE 802.11, which is a WLAN standard, or IEEE 802.15.1, which is a short-range wireless communication standard, can also be used in place of the protocol of Bluetooth® low energy.

According to the first to fourth exemplary embodiments, to carry out the connection between the devices that wirelessly communicate the control data, the power transmission apparatus transmits a polling signal, and the power receiving apparatus transmits a connection request to the power transmission apparatus, in response to the polling signal. However, the present invention not limited to such a configuration. For example, the present invention can be implemented by a configuration in which the power receiving apparatus transmits a polling signal, and the power transmission apparatus transmits a connection request to the power receiving apparatus, in response to this polling signal.

According to the above-described first to fourth exemplary embodiments, the resonance frequency of each of the power transmission antenna and the power receiving antenna is about 6.78 MHz in the HF band, but the present invention is not limited to this frequency. An antenna of another frequency band can be used as long as the antenna allows electric power to be wirelessly transmitted. The present invention is applicable to any configuration as long the configuration is intended to prevent an electromagnetic wave emitted from a power transmission apparatus for wireless power transmission, from exerting influence on a contactless IC card if the electromagnetic wave is detected by an RF detection unit of the power transmission apparatus or an antenna of a power receiving apparatus, and transmission electric power of the power transmission apparatus is dynamically controlled and restricted.

In the configuration according to the first to fourth exemplary embodiments, the electromagnetic wave around 13.56 MHz is detected by the RF detection unit of the power transmission apparatus or the RX communication antenna of the power receiving apparatus to protect the contactless IC card with the antenna having the resonance frequency around 13.56 MHz. However, 13.56 MHz is a description example, and the frequency to be detected by the RF detection unit the power transmission apparatus or the RX communication antenna of the power receiving apparatus is not limited to 13.56 MHz or its neighborhood. When the resonance frequency of the antenna provided in the contactless card requiring protection is the "f", the frequency of the electromagnetic wave to be dealt in the RF detection unit of the power transmission apparatus or the RX communication antenna of the power receiving apparatus only has to be this resonance frequency "f".

The first to fourth exemplary embodiments are described using the contactless IC card as an example of the device to be protected. However, the protect target device to which the present invention is applicable is not limited to the contactless IC card. The present invention is applicable to any type of device if the device has an antenna that can receive an electromagnetic wave from the outside similar to the contactless IC card.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes or more circuits (e.g., application specific integrated circuit (ASIC)) for performing the functions of or more of the above-described embodiment(s), and by a method performed by the computer of the system or apparatus by, for example, reading out and executing the computer executable instructions from the storage medium to perform the functions of one or more of the above-described embodiment (and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference co exemplary embodiments, it is to understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-208835, filed Oct. 23, 2015, which is hereby incorporated by reference herein in its entirety.

What is claimed is:

1. A power supply apparatus for wirelessly transmitting electric power, the power supply apparatus comprising:
   a power supply unit configured to output a wireless signal of a predetermined frequency to supply power to a power receiving apparatus;
   an antenna having a frequency of a second-order harmonic of the predetermined frequency being a resonance frequency;
   a communication unit; and
   a control unit,
   wherein the control unit receives data from the power receiving apparatus via the communication unit, and controls an output of the power supply unit based on the data, and
   wherein the control unit detects intensity of a second-order harmonic component of the wireless signal output from the power supply apparatus by the antenna, and controls the output of the power supply unit such that the detected intensity of the second-order harmonic component becomes equal to or less than a predetermined value.

2. The power supply apparatus according to claim 1, wherein the data includes one or more of remaining battery capacity, maximum power reception, or reception electric power.

3. The power supply apparatus according to claim 1, wherein a communication range of the communication unit is wider than a power supply range of the power supply unit.

4. The power supply apparatus according to claim 1, further comprising a first antenna and a second antenna,
   wherein the power supply unit outputs the wireless signal of the predetermined frequency via the first antenna, and
   wherein the communication unit connects with an external apparatus via the second antenna.

5. The power supply apparatus according to claim 1, wherein the power supply unit outputs the wireless signal of the predetermined frequency in compliance with near field communication (NFC) standard.

6. The power supply apparatus according to claim 1, wherein the communication unit connects with an external apparatus in compliance with Bluetooth® low energy (BLE) standard.

7. The power supply apparatus according to claim 1, wherein the control unit detects intensity of a second-order harmonic component of the wireless signal output from the power supply apparatus, and controls the output of the power supply unit such that the detected intensity of the second-order harmonic component becomes equal to or less than a predetermined value.

8. A control method for a power supply apparatus including a communication unit for communicating with a power receiving apparatus, a power supply unit for outputting a wireless signal of a predetermined frequency to supply power to the power receiving apparatus, and an antenna having a frequency of a second-order harmonic of the predetermined frequency being a resonance frequency, the control method comprising:
   receiving data from the power receiving apparatus via the communication unit, and controlling an output of the power supply unit based on the data;
   detecting intensity of a second-order harmonic component of the wireless signal output from the power supply apparatus by the antenna; and
   controlling the output of the power supply unit such that the detected intensity of the second-order harmonic component becomes equal to or less than a predetermined value.

9. The control method according to claim 8, wherein the data includes one or more of remaining battery capacity, maximum power reception, or reception electric power.

10. The control method according to claim 8, wherein a communication range of the communication unit is wider than a power supply range of the power supply unit.

11. The control method according to claim 8, wherein the power supply apparatus further includes a first antenna and a second antenna,
    wherein the power supply unit outputs the wireless signal of the predetermined frequency via the first antenna, and
    wherein the communication unit connects with an external apparatus via the second antenna.

12. The control method according to claim 8, wherein the power supply unit outputs the wireless signal of the predetermined frequency in compliance with near field communication (NFC) standard.

13. The control method according to claim 8, wherein the communication unit connects with an external apparatus in compliance with Bluetooth® low energy (BLE) standard.

14. The control method according to claim 8, further comprising:
    detecting intensity of a second-order harmonic component of the wireless signal output from the power supply apparatus; and
    controlling the output of the power supply unit such that the detected intensity of the second-order harmonic component becomes equal to or less than a predetermined value.

15. A non-transitory recording medium storing a program for causing a power supply apparatus to perform a control method, the power supply apparatus including a communication unit for communicating with a power receiving apparatus, a power supply unit for outputting a wireless signal of a predetermined frequency to supply power to the power receiving apparatus, and an antenna having a frequency of a second-order harmonic of the predetermined frequency being a resonance frequency, the control method comprising:
   receiving data from the power receiving apparatus via the communication unit, and controlling an output of the power supply unit based on the data;
   detecting intensity of a second-order harmonic component of the wireless signal output from the power supply apparatus by the antenna; and
   controlling the output of the power supply unit such that the detected intensity of the second-order harmonic component becomes equal to or less than a predetermined value.

* * * * *